US010181277B2

(12) United States Patent
Choi et al.

(10) Patent No.: US 10,181,277 B2
(45) Date of Patent: Jan. 15, 2019

(54) ELECTRONIC DEVICE AND METHOD OF REDUCING POWER CONSUMPTION THEREOF

(71) Applicant: Samsung Electronics Co., Ltd., Gyeonggi-do (KR)

(72) Inventors: Seungchul Choi, Gyeonggi-do (KR); Chihyun Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 196 days.

(21) Appl. No.: 15/051,234

(22) Filed: Feb. 23, 2016

(65) Prior Publication Data
US 2016/0247437 A1 Aug. 25, 2016

(30) Foreign Application Priority Data
Feb. 23, 2015 (KR) .......................... 10-2015-0025173

(51) Int. Cl.
*G06F 1/32* (2006.01)
*G09G 5/10* (2006.01)
(Continued)

(52) U.S. Cl.
CPC ......... *G09G 3/2003* (2013.01); *G06F 1/3212* (2013.01); *G06F 1/3265* (2013.01);
(Continued)

(58) Field of Classification Search
CPC ........ G06F 1/32; G06F 1/3203; G06F 1/3212; G06F 1/3215; G06F 1/3265;
(Continued)

(56) References Cited

U.S. PATENT DOCUMENTS 5,065,357 A * 11/1991 Shiraishi ............... G06F 1/3218
345/102
5,386,577 A * 1/1995 Zenda ................... G06F 1/3218
315/169.3
(Continued)

FOREIGN PATENT DOCUMENTS

| EP | 1 758 357 | 2/2007 |
| KR | 1020110099411 | 9/2011 |
| KR | 10-1375982 | 3/2014 |

OTHER PUBLICATIONS

International Search Report dated Jun. 13, 2016 issued in counterpart application No. PCT/KR2016/001744, 4 pages.
(Continued)

*Primary Examiner* — Michael J Eurice
(74) *Attorney, Agent, or Firm* — The Farrell Law Firm, P.C.

(57) ABSTRACT

An electronic device and a method of reducing power consumption in an electronic device are provided. The electronic device includes a display device configured to display a color screen, a battery, at least one processor electrically connected to the display device and the battery, and a memory electrically connected to the at least one processor, wherein the memory stores instructions to allow the at least one processor to monitor a charging level of the battery, to convert at least some areas of the color screen to be displayed on the display device to black and white in response to one of a monitored battery charging level and a user input and to reverse at least a part of the areas converted to black and white when the instructions are executed.

18 Claims, 29 Drawing Sheets

(51) Int. Cl.
*G09G 3/20* (2006.01)
*G09G 5/06* (2006.01)
*G09G 3/34* (2006.01)
*G09G 3/3208* (2016.01)
*G09G 5/02* (2006.01)

(52) U.S. Cl.
CPC .............. *G06F 1/32* (2013.01); *G06F 1/3203* (2013.01); *G06F 1/3215* (2013.01); *G09G 3/2092* (2013.01); *G09G 3/3208* (2013.01); *G09G 3/3406* (2013.01); *G09G 5/028* (2013.01); *G09G 5/06* (2013.01); *G09G 5/10* (2013.01); *G09G 2320/0271* (2013.01); *G09G 2320/0606* (2013.01); *G09G 2320/0646* (2013.01); *G09G 2330/02* (2013.01); *G09G 2330/021* (2013.01); *G09G 2340/06* (2013.01); *Y02B 60/1242* (2013.01); *Y02B 60/1292* (2013.01); *Y02D 10/153* (2018.01); *Y02D 10/174* (2018.01)

(58) Field of Classification Search
CPC .. G09G 3/2003; G09G 3/2092; G09G 3/3208; G09G 3/3406; G09G 5/10; G09G 5/028; G09G 5/06; G09G 2320/0271; G09G 2320/0606; G09G 2320/0646; G09G 2330/02; G09G 2330/021; G09G 2340/06; Y02B 60/1242; Y02B 60/1292
See application file for complete search history.

(56) References Cited

U.S. PATENT DOCUMENTS

| | | | | |
|---|---|---|---|---|
| 6,462,724 B1* | 10/2002 | Ozawa | ............. | G02F 1/133536 345/103 |
| 6,603,469 B1* | 8/2003 | Gettemy | ............. | G06F 1/3203 345/102 |
| 7,019,762 B2* | 3/2006 | Yoshihara | ............. | G09G 3/3648 345/102 |
| 7,176,879 B1* | 2/2007 | Yoshihara | ............. | G09G 3/3413 345/102 |
| 2001/0017604 A1* | 8/2001 | Jacobsen | ............. | G02B 25/002 345/27 |
| 2001/0030511 A1* | 10/2001 | Yamazaki | ............. | G09G 3/3258 315/160 |
| 2001/0043166 A1* | 11/2001 | Jacobsen | ............. | G02B 25/002 345/27 |
| 2002/0000960 A1* | 1/2002 | Yoshihara | ............. | G09G 3/342 345/87 |
| 2002/0093475 A1* | 7/2002 | Hashimoto | ............. | G09G 3/3611 345/87 |
| 2002/0180723 A1* | 12/2002 | Siwinski | ............. | G09G 3/3208 345/212 |
| 2002/0186214 A1* | 12/2002 | Siwinski | ............. | G09G 3/3208 345/212 |
| 2003/0231160 A1* | 12/2003 | Yoshihara | ............. | G09G 3/3648 345/102 |
| 2004/0041802 A1* | 3/2004 | Tsutsui | ............. | G09G 3/3648 345/211 |
| 2004/0201583 A1* | 10/2004 | Burroughes | ............. | G06F 1/3203 345/211 |
| 2005/0122284 A1* | 6/2005 | Gates | ............. | G09G 3/344 345/60 |
| 2006/0232538 A1* | 10/2006 | Kobashi | ............. | G09G 3/3614 345/94 |
| 2007/0018919 A1* | 1/2007 | Zavracky | ............. | G09G 3/3406 345/87 |
| 2007/0040820 A1* | 2/2007 | Lee | ............. | G06F 1/3218 345/204 |
| 2008/0001944 A1* | 1/2008 | Chang | ............. | G09G 3/3611 345/214 |
| 2010/0174930 A1* | 7/2010 | Kim | ............. | G06F 1/3265 713/320 |
| 2010/0188392 A1* | 7/2010 | Lee | ............. | G09G 3/3208 345/212 |
| 2011/0216102 A1* | 9/2011 | Kim | ............. | G09G 5/00 345/690 |
| 2012/0297215 A1* | 11/2012 | Saba | ............. | G06F 1/3203 713/320 |
| 2013/0002729 A1* | 1/2013 | Lee | ............. | G09G 3/20 345/690 |
| 2013/0321380 A1* | 12/2013 | Chuei | ............. | G09G 3/3466 345/212 |
| 2014/0092140 A1 | 4/2014 | Wadhwa et al. | | |
| 2014/0159587 A1* | 6/2014 | Sezan | ............. | G09G 3/3466 315/152 |
| 2014/0160137 A1* | 6/2014 | Martin | ............. | G09G 3/3466 345/531 |
| 2014/0333602 A1* | 11/2014 | Yang | ............. | G06F 1/3262 345/212 |
| 2015/0286267 A1* | 10/2015 | Yang | ............. | G06F 1/3262 345/174 |
| 2015/0346987 A1* | 12/2015 | Ren | ............. | G06F 1/32 345/589 |

OTHER PUBLICATIONS

European Search Report dated Aug. 10, 2016 issued in counterpart application No. 16156506.4-1972, 7 pages.
Apple, iPad User Guide for iOS 8.1 Software, XP055497607, Jan. 1, 2014, 164 pages.
European Search Report dated Aug. 13, 2018 issued in counterpart application No. 16156506.4-1216, 8 pages.

* cited by examiner

```
<li id="NS_139"> <a href="http://newsstand.naver.com/?list=ct1&pcode=139" target="_blank"
class="newssa"> <img src="http://img.naver.net/static/newsstand/up/2014/0715/139.gif"
width="81" height="73" alt="sportalkorea" /> </a>
</li>
```

ELECTRONIC DEVICE AND METHOD OF REDUCING POWER CONSUMPTION THEREOF

PRIORITY

This application claims priority under 35 U.S.C. § 119(a) to Korean Patent Application No. 10-2015-0025173, filed on Feb. 23, 2015, the entire content of which is incorporated herein by reference.

BACKGROUND

1. Field of the Disclosure

The present disclosure relates generally to a method of reducing power consumption in electronic device. In particular the method relates to reducing the brightness of a display to reduce power consumption.

2. Description of the Related Art

Recent electronic devices (for example, a smart phone) have increasing power consumption due to hardware requirements and various interface environments. However, a battery that is mounted in the electronic device to supply power to the electronic device has capacity limitations. Accordingly, various methods of increasing the time of battery use have been proposed. For example, the electronic device may operate in a normal user mode or a power saving mode and, in the power saving mode, limit a maximum clock speed of a processor (for example, a Central Processing Unit (CPU), an Application Processor (AP), and the like) or reduce brightness of a display to reduce current consumption.

Recently, the display size and resolution of electronic devices have gradually increased. As the display specification increases, power consumed by the display itself may be a big part of the total power consumption of the portable electronic device. As the resolution increases, data throughput increases and thus current consumption of a processor also increases. Accordingly, it is difficult to achieve a satisfactory reduction of current consumption through conventional power saving methods.

SUMMARY

The present disclosure has been made to address a current consumption increase according to the increase in the display specification through an improved power saving mode function.

In accordance with an aspect of the present disclosure, an electronic device includes a display device configured to display a color screen, a battery, one or more processors electrically connected to the display device and the battery, and a memory electrically connected to the one or more processors, wherein the memory stores instructions to allow the one or more processors to monitor a charging level of the battery, to convert at least some areas of the color screen to be displayed on the display device to be black and white in response to a monitored charging level or a user input and to reverse at least a part of the areas converted to be black and white when the instructions are executed.

In accordance with another aspect of the present disclosure, an electronic device is provided. The electronic device includes a display device configured to display a color screen, a battery, one or more processors electrically connected to the display device and the battery, and a memory electrically connected to the one or more processors, wherein the memory includes a first application including a color user interface and a black and white user interface, and stores instructions to allow the one or more processors to monitor a charging level of the battery and to change the color user interface displayed on the display device to the black and white user interface in response to the monitored charging level or a user interface when the instructions are executed.

In accordance with another aspect of the present disclosure, an electronic device is provided. The electronic device includes a display panel, a display controller for controlling the display panel, and a processor for controlling the display controller, wherein at least one of the processor and the display controller recognizes an area to be preserved in contents, reverses the remainder except for the area to be preserved to generate a reversed screen, and controls displaying of the reversed screen.

In accordance with another aspect of the present disclosure, a method of reducing power consumption by an electronic device is provided. The method includes recognizing an area to preserve color content and reverse the color content outside the recognized area.

In accordance with another aspect of the present disclosure, a method of reducing power consumption by an electronic device is provided. The method includes displaying a color screen on a display, converting at least some areas of the color screen to be black and white in response to a charging level of a battery or a user input, and reversing at least a part of the area converted to be black and white.

In accordance with another aspect of the present disclosure, a method of reducing power consumption by an electronic device is provided. The method includes displaying a color screen on a display, and converting a color user interface of the color screen into a black and white user interface in response to a charging level of a battery or a user input.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

Figure 1:
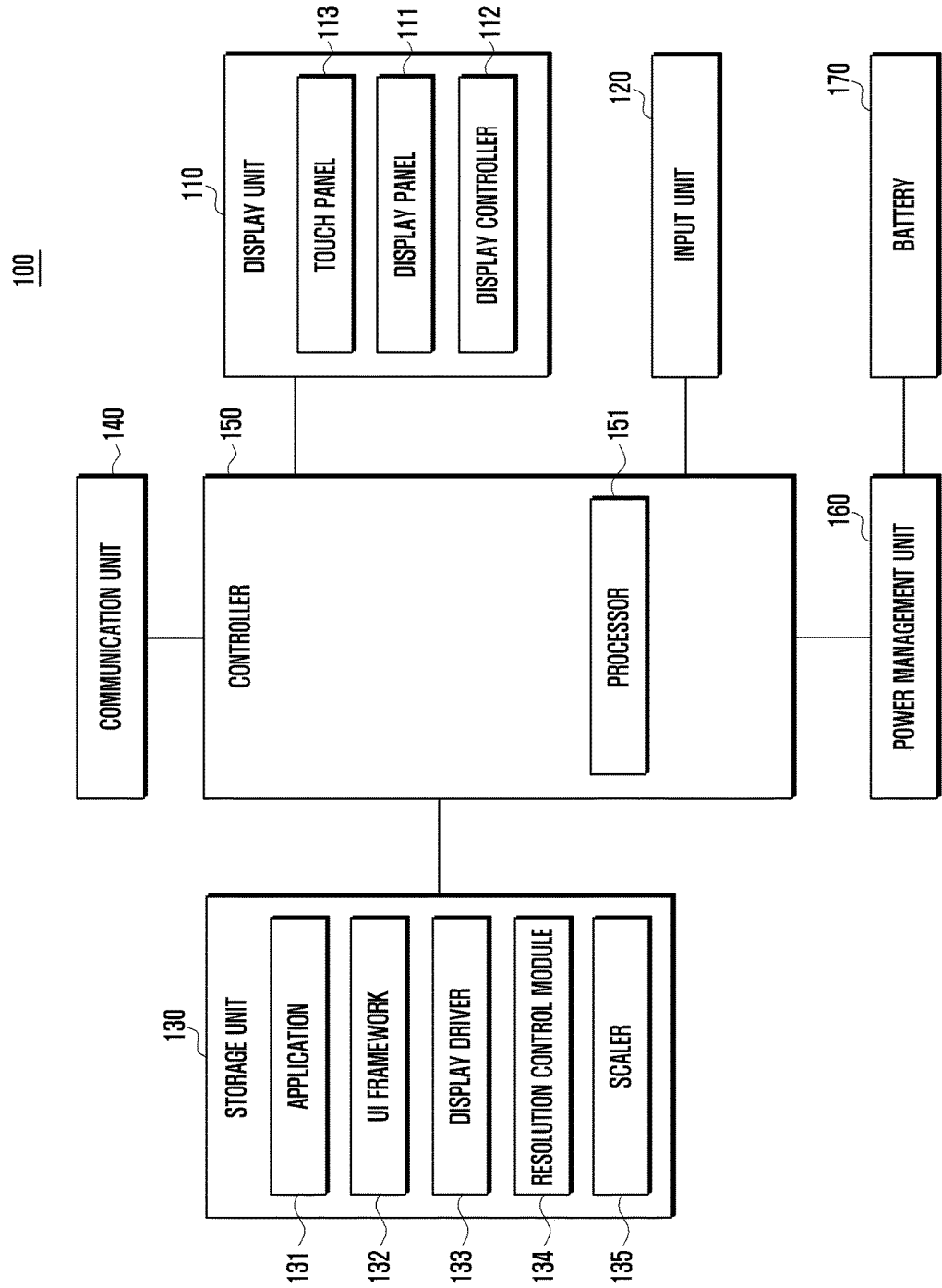
FIG. 1 is a block diagram of an electronic device according to various embodiments of the present disclosure.

Hereinafter, various embodiments of the present disclosure will be described in detail with reference to the accompanying drawings. The present disclosure may be modified in various forms and include various embodiments, but specific examples are illustrated in the drawings and described in the description. However, the description is not intended to limit the present disclosure to the specific embodiments, and it shall be appreciated that all the changes, equivalents and substitutions belonging to the idea and technical scope of the present disclosure are included in the present disclosure. In describing the drawings, similar reference numerals are used to designate similar elements.

The terms "include" or "may include" refer to the existence of a corresponding disclosed function, operation or component which can be used in various embodiments of the present disclosure and do not limit one or more additional functions, operations, or components. In the present disclosure, the terms such as "include" or "have" may be construed to denote a certain characteristic, number, step, operation, constituent element, component or a combination thereof, but are not to be construed to exclude the existence of or a possibility of addition of one or more other characteristics, numbers, steps, operations, constituent elements, components or combinations thereof.

The term "or" as used in various embodiments of the present disclosure includes any or all of combinations of listed words. For example, the expression "A or B" may include A, may include B, or may include both A and B.

The expressions "1", "2", "first", or "second" used in various embodiments of the present disclosure may modify various components of various embodiments but does not limit the corresponding components. For example, the above expressions do not limit the sequence and/or importance of the elements. The above expressions are used merely for the purpose of distinguishing an element from the other elements. For example, without departing from the scope of the present disclosure, a first component element may be referred to as a second component element. Similarly, the second component element also may be referred to as the first component element.

The terms in various embodiments of the present disclosure are used to describe a specific embodiment, and are not intended to limit the present disclosure. As used herein, the singular forms are intended to include the plural forms as well, unless the context clearly indicates otherwise.

Unless defined differently, all terms used herein, which include technical terminologies or scientific terminologies, have the same meaning as understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

An electronic device according to various embodiments of the present disclosure may have a battery and display various content by receiving power from the battery. For example, the electronic device may include at least one of a smart phone, a tablet Personal Computer (PC), a mobile phone, a video phone, an e-book reader, a desktop PC, a laptop PC, a netbook computer, a PDA, a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and a smart watch.

According to an embodiment of the present disclosure, the electronic device may be a smart home appliance that has a battery displays various content by receiving power from the battery. The smart home appliance may, for example, include at least one of a television, a digital video disk (DVD) player, an audio, an electronic dictionary, and a camcorder.

According to an embodiment of the present disclosure, the electronic device may include at least one of various medical devices (e.g., a magnetic resonance angiography (MRA), a magnetic resonance imaging (MRI), a computed tomography (CT) machine, and an ultrasonic machine), navigation devices, global positioning system (GPS) receivers, event data recorders (EDR), flight data recorders (FDR), vehicle infotainment devices, electronic devices for ships (e.g., navigation devices for ships, and gyro-compasses), avionics, security devices, automotive head units, robots for home or industry, automatic teller machines (ATMs) in banks, or point of sales (POS) terminals in shops.

According to an embodiment of the present disclosure, the electronic device may include at least one of furniture or a part of a building/structure, an electronic board, an electronic signature receiving device, a projector, and various types of measuring devices (e.g., a water meter, an electricity meter, a gas meter, a radio wave meter, etc.), which has a battery displays various content by receiving power from the battery. An electronic device according to various embodiments of the present disclosure may be a combination of one or more of above described various devices. An electronic device according to various embodiments of the present disclosure may be a flexible device. An electronic device according to various embodiments of the present disclosure is not limited to the above described devices.

The term "screen" used in various embodiments may refer to a physical screen of a display unit. For example, the term "screen" in the phrases "contents are displayed on a screen" "a display unit displays contents on a screen" or "a controller controls a display unit to display contents on a screen" may be used as "a physical screen of the display unit". Meanwhile, the term "screen" may refer to a target to be displayed on the display unit, such as the screen in the phrases "an application screen is displayed", "a display unit displays an application screen", or "a controller controls a display unit to display an application screen".

The electronic device of the present disclosure can increase the use time of a battery by applying a power saving mode according to various embodiments of the present disclosure. In particular, the electronic device can significantly reduce current consumption of a display panel, such as a self light emitting display) by changing a white color family to a black color family and displaying the black color family in content. Further, the electronic device reverses the content but excludes a part of the displayed content (for example, an image), thereby reducing current consumption and maintaining the visibility of the image.

Hereinafter, various embodiments of the present disclosure will be described with reference to the accompanying drawings.

FIG. 1 is a block diagram of an electronic device according to various embodiments of the present disclosure.

Referring to FIG. 1, an electronic device 100 according to various embodiments of the present disclosure includes a display unit 110, an input unit 120, a storage unit 130, a communication unit 140, a controller 150, a power management unit 160, and a battery 170.

The display unit 110 may display contents on a content screen under the control of the controller 150. For example, the controller 150 may process the content (for example, an HTML document, a compressed image (for example, JPEG), and the like) into image data and store the image data in a memory (for example, a frame buffer). The controller 150 may process the image data once more (for example, change the image data to a black and white screen, reverse at least some colors of the black and white screen, change a resolution of the screen, and the like) and store the processed image data in the memory. The display unit 110 may convert at least a part of the image data (content) stored in the frame buffer into an analog signal and display the analog signal on the content screen. The content screen may refer to the entirety or a part of the physical screen of the display unit 110. Further, the content may include a plurality of sub content. Each of the sub content may be processed (for example, rendered) into image data to be displayed on the screen, and merged by any element (for example, an application processor) of the electronic device 100 and stored in the frame buffer.

The display unit 110 may include a display panel 111 (for example, Active-Matrix Organic Light-Emitting Diode (AM-OLED) and the like). The display panel 111 may be implemented to be flexible, transparent, or wearable. The display unit 110 may include a hologram (not shown) that shows a three-dimensional image in the air by using interference of the light.

The display unit 110 may further include a display controller 112 for controlling the display panel 111 and the hologram. The display controller 112 may perform some functions of another element (for example, the processor 151) on behalf of the processor 151. For example, the display controller 112 may serve as a scaler that processes (enlarges or reduces) the image data processed by the processor 151 to fit the size of the content screen.

The display unit 110 may include a touch panel 113 which is an input unit for an interaction between a user and the electronic device 100. The display unit 110 may be interchangeable with a touch screen. The touch panel 113 may be implemented in an add-on type in which the touch panel 113 is located on the screen of the display unit 110, or an on-cell type or an in-cell type in which the touch panel is inserted into the display unit 110. The touch panel 113 may detect a user input in at least one of a capacitive type, a resistive type, an infrared type, and an ultrasonic wave type, generate an event corresponding to the user input, and transfer the generated event to the controller 150. The touch panel 113 may detect a gesture of a conductive object, that is, an input object (for example, a finger or a stylus) which directly contacts the screen or is in proximity to or hovered on the screen within a predetermined range in which the touch panel 113 can detect the object. The touch panel 113 may generate an event corresponding to the gesture and transfer the generated event to the controller 150.

The input unit 120 may include, for example, a touch key, separately from the touch panel 111 installed in the display unit 110. The touch key may recognize a touch or proximity of a human body and an object. The input unit 120 may generate an event in response to a user input and transfer the generated event to the controller 150. The input unit 120 may further include a key (for example, a dome key) in a type different from the touch type. For example, when the user presses the dome key, the dome key is transformed to contact a printed circuit board and an event is generated on the printed circuit board and transmitted to the controller 150. The user may control the input unit (for example, the touch panel 113 or the input unit 120) to switch an operating mode of the electronic device 100 from a normal mode to a power saving mode or vice versa. That is, the controller 150 may switch the operating mode of the electronic device 100 in response to a user input.

The storage unit 130 may store data generated by the electronic device 100 or received from an external device through the communication unit 140 under the control of the controller 150. The storage unit 130 may store various pieces of configuration information for configuring a use environment of the electronic device 100. Any element (for example, the processor 151 or the display controller 112) of the electronic device 100 may operate the electronic device 100 with reference to the configuration information. For example, the configuration information may include information indicating whether to configure the power saving mode, information on a configuration for executing the power saving mode, information on content to which the power saving mode can be applied, and information on an application, a function, or a service which can be used when the electronic device 100 operates in the power saving mode.

The storage unit 130 stores various programs for operating the electronic device 100. For example, the storage unit 130 stores a booting program, an operating system (for example, kernel), middleware (for example, an application framework and a library), and an Application Programming Interface (API). The storage unit 130 may include an application 131, a User Interface (UI) framework 132, a display driver 133, a resolution control module 134, and a scaler 135. The application 131 is a means for an interaction with the user and provides a menu for configuring a low power function to the controller 150. The application 131 may include a browser application, a video player application, a camera application, or other user programs. The UI framework 132 (called a view system) may be a part of the application framework and serve to provide a command set for displaying an application screen to the controller 150. The display driver 133 may be a part of the kernel and serve to provide control commands for driving the display panel 111 to the display controller 112. The resolution control module 134 may be configured to allow the controller 150 or the display controller 112 to perform a function of controlling the resolution of content. The scaler 135 may be configured to allow the controller 150 or the display controller 112 to perform a function of scaling-up or scaling-down the image data processed by the UI framework 132.

The storage unit 130 may include a main memory and a secondary memory. The main memory may be implemented by a Random Access Memory (RAM). The secondary memory may be implemented by a disc, a RAM, a Read Only Memory (ROM), or a flash memory. The main memory may store various programs loaded from the secondary memory. When power is supplied to the controller 150, a booting program may be first loaded to the main memory. The booting program may load an operating system to the main memory. The operating system may load the application 131, the UI framework 132, the display driver 133, the resolution control module 134, or the scaler 135 to the main memory. The controller 150 may access the main memory to interpret a command (routine) of a program, and execute a function according to the interpretation.

The storage unit 130 may further include an external memory. For example, the storage unit 130 may include Compact Flash (CF), Secure Digital (SD), Micro-Secure Digital (Micro-SD), Mini-Secure Digital (mini-SD), extreme Digital (xD), or a memory stick as the external memory.

The communication unit 140 may perform a voice call, video call, or data communication with an external device through a network under the control of the controller 150. The communication unit 140 may include a cellular module (for example, a communication module providing a voice call, video call, text message service, or the Internet access service through a communication network (for example, Long-Term Evolution (LTE), Long-Term Evolution Advanced (LTE-A), Code Division Multiple Access (CDMA), Wideband CDMA (WCDMA), Universal Mobile Telephone System (UMTS), WiBro, or Global System/Standard for Mobile Communication (GSM)), a digital broadcast module (for example, a Digital Multimedia Broadcasting (DMB) module), and a short range communication module (for example, a Wi-Fi module, a Bluetooth module, and a Near Field Communication (NFC) module).

The controller 150 controls general operations of the electronic device 100 and the signal flow between internal elements of the electronic device 100, processes data, and controls the power supplied to the elements from the battery.

The controller 150 may include the processor 151. The processor 151 may include an Application Processor (AP), a Communication Processor (CP), a Graphic Processing Unit (CPU), and an audio processor. The CP may be a component of the cellular module of the communication unit 140. The processor 151 (for example, the AP) may implement a power consumption reduction method by using the application 131, the User Interface (UI) framework 132, the display driver 133, the resolution control module 134, or the scaler 135.

The power management unit 160 may manage power of the electronic device 100. The power management unit 160 may include a Power Management Integrated Circuit (PMIC), a charger Integrated Circuit (IC), or a battery or fuel gauge. The battery gauge may monitor, for example, a charging level (for example, a residual quantity of the battery 170, and a voltage, a current, or a temperature during the charging).

The battery 170 may store or generate electricity and may supply power to the electronic device 100 by using the stored or generated electricity. The battery 170 may include a rechargeable battery or a solar battery.

The electronic device 100 may further include a sensor for detecting a physical quantity (for example, acceleration, gravity, and the like). The sensor may transfer data indicating the detected physical quantity to the controller 150. The controller 150 may recognize a position of the electronic device 100 based on the data received from the sensor, determine a screen display mode as a landscape mode or a portrait mode based on the position, and control the display unit 110 to display the content according to the determined mode. In addition, elements such as an earphone jack, a GPS reception module, a speaker, a microphone, and the like, which have not been mentioned above, may be further included in the electronic device 100. The electronic device 100 may further include an interface unit for a wired connection with an external device. The interface unit may be connected to the external device through a wire (for example, a USB cable). The controller 150 may perform data communication with the external device through the interface unit.

Figure 2A:
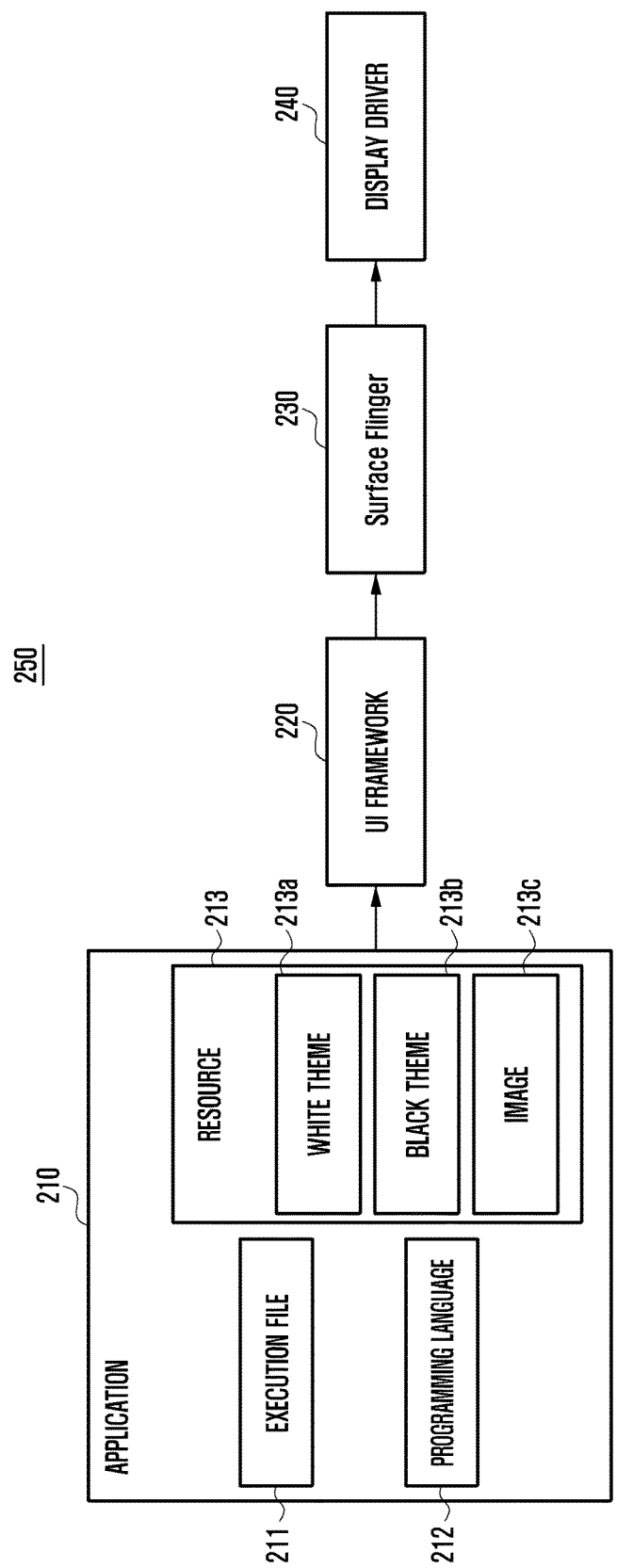
FIG. 2A is a block diagram of a programming module for a method of reducing power consumption according to various embodiments of the present disclosure.

FIG. 2A is a block diagram of a programming module for a method of reducing power consumption according to various embodiments of the present disclosure.

The programming module 250 may be included (or stored) in the electronic device 100 (for example, the storage unit 130) of FIG. 1. The programming module 250 may be formed of software, firmware, or hardware, or a combination of two or more thereof. The programming module 250 may be implemented in hardware (for example, the electronic device 100). Referring to FIG. 2, the programming module 250 includes an application 210, a UI framework 220, surface flinger 230, and a display driver 140.

The application 210 provides content to the UI framework 220. For example, the application 210 may be a preloaded application (for example, a call, contact, browser, message, setting, or an electronic book application) ddesignated by a manufacturer of the electronic device 100. Further, the application 210 may include an email application, a calendar application, a camera application, an alarm application, a health care application (for example, an application for measuring an exercise quantity or blood sugar levels), an environment information application (for example, an application for providing atmospheric pressure, humidity, or temperature information), an application for providing an operation state of the electronic device 100 (for example, time, a residual amount of battery charge, a signal strength of an accessed wireless network (for example, Wi-Fi, 4G, or Bluetooth), or an application related to data communication between the electronic device 100 and an external electronic device. The application related to the data communication may include a notification relay application for transferring predetermined information to an external electronic device, a device management application for managing an external electronic device, an SMS/MMS application, a chatting application, or a call application. The notification relay application may include transferring to the external electronic device, notification information generated from other applications of the electronic device 100 (for example, an SMS/MMS application, an e-mail application, a health care application, an environment information application, and the like). The notification relay application may receive notification information from an external electronic device and provide the received notification information to a user. The device management application may manage (for example, install, delete, or update) a function of at least a part of an external electronic device that communicates with the electronic device 100 (for example, turning on/off the external electronic device itself (or a few elements) or adjusting brightness (or resolution) of a display), an application executed in the external electronic device, or a service provided from the external electronic device (for example, a call service or a message service).

The application 210 includes an execution file 211 (for example, Dalvic.exe), a programming language 212 (for example, eXtensible Markup Language (XML)), and a resource 213. The application 210 is a resource of a background screen and may have a white theme 213*a* and a black theme 213*b*. Further, the application 210 is a resource of a foreground screen and may have various images 213*c*.

The white theme 213*a* may be used while the electronic device 100 operates in a normal mode. The white theme 213*a* may be all white in color. The white theme 213*a* may include an image of which more than half the screen areas are white. The white theme 213*a* may include an image (that is, an overall bright image) of which a brightness value is greater than or equal to a preset threshold. The brightness value may be defined as a value indicating brightness of the content. For example, a range of the brightness value may correspond to values between 0 and 10. The whole color of the content may be white when the brightness value is 10, and may be black when the brightness value is 0.

The black theme 213*b* may be used while the electronic device 100 operates in a power saving mode. The black theme 213*b* may include, for example, a whole black image or an image of which more than half the screen areas are black. The black theme 213*a* may include an image (that is, an overall dark image) of which a brightness value is smaller than a preset threshold.

The entire content screen (color screen) may be changed into a black and white screen. For example, a background screen may switch from the white theme 213*a* to the black theme 213*b*, and a foreground screen displayed on the background screen may be processed to be black and white. Only a part of the screen may be a black and white screen. For example, the black theme 213*b* may be applied to the background screen and the foreground screen or the remainder except for an image from the foreground screen may be processed to be black and white. Content such as an image or a video may be black and white or processed in reverse regardless of the theme in the foreground screen.

The application 210 provides the UI framework 220 with information for enabling the UI framework 220 to recognize a screen area to be reversed, which requires the reverse processing, and an area to be preserved in the color screen or the black and white screen. For example, the content may be divided into a plurality of areas according to a delimiter (for example, a separation mark, a frame, and the like) and the type of information contained in the corresponding content (for example, an image, a video, text, a message, an electronic document, and the like). The application 210 may provide information on such areas. For each area the application 210 may include layout information (for example, a coordinate value of a boundary), size information (for example, a width, a height, an area, and the like), information on the content existing within the area, and the like. The information on the content may include information indicating the type, information on a source (for example, a camera, e-book, browser, and the like) of the corresponding content, and the like.

The UI framework 220 may process or render the content into image data (for example, a surface). For example, the UI framework 220 may receive first content (for example, operation state information) and second content (for example, a background screen) from a first application and render the first content and the second content into a first surface and a second surface, respectively. Further, the UI framework 220 may receive third content (for example, a webpage) from a second application (for example, a web browser) and render the third content into a third surface. The UI framework 220 may transfer the surfaces to the surface flinger 230 or other compositor. The surface flinger 230 may merge the surfaces into one surface to be displayed on the screen. The surface flinger 230 may transfer the image data (for example, one merged surface) to the display driver 240.

In the display panel, an AMOLED may have pixels, each of which emits light and expresses a color without the use of a backlight unit. As the color is closer to white, the pixel of the AMOLED may consume more power. Accordingly, in a self light emitting display such as the AMOLED, when the screen color is changed to black and white (that is, a chromatic color is changed to an achromatic color) or when a white color family is changed to a black color family, current consumption may significantly decrease. According to an embodiment of the present disclosure, the UI framework 220 may change the color of the image data to black and white to generate the black and white screen and transfer the black and white screen to the display driver 240.

According to some embodiments, the UI framework 220 may change a white color family into a black color family in the image data to generate a reversed screen, and transfer the reversed screen to the display driver 240.

According to an embodiment of the present disclosure, the UI framework 220 may recognize an area to be reversed in the image data based on information (for example, information on areas) received from the application 210. The UI framework 220 may reverse a color of some areas in the image data (that is, the recognized area to be reversed (for example, a text area and a background area except for an area to be preserved (for example, an image area))) to generate a reversed screen and transfer the reversed screen to the display driver 240.

According to an embodiment of the present disclosure, when the entire black and white screen corresponds to the area to be reversed, the UI framework 220 may reverse the color of the entire black and white screen to generate a reversed screen and transfer the reversed screen to the display driver 240. When there is an image area to be preserved in the black and white screen the UI framework 220 may first reverse the color of the area to be preserved (that is, reverse the color of only the preserved image area) to generate a first reversed screen and reverse the first reversed screen to generate a second reversed screen. By reversing the area to be preserved and then reversing the area again, the remaining areas of the black and white screen except for the area to be preserved may be reversed and thus changed to the second reversed screen. The UI framework 220 may transfer the second reversed screen to the display driver 240.

According to an embodiment of the present disclosure, when there is an image area to be preserved in the black and white screen, the UI framework 220 may reverse the remaining areas except for the area to be preserved to generate a reversed screen and transfer the reversed screen to the display driver 240.

The display driver 240 may control the display controller 112 to display the image data received from the UI framework 220.

Figure 2B:
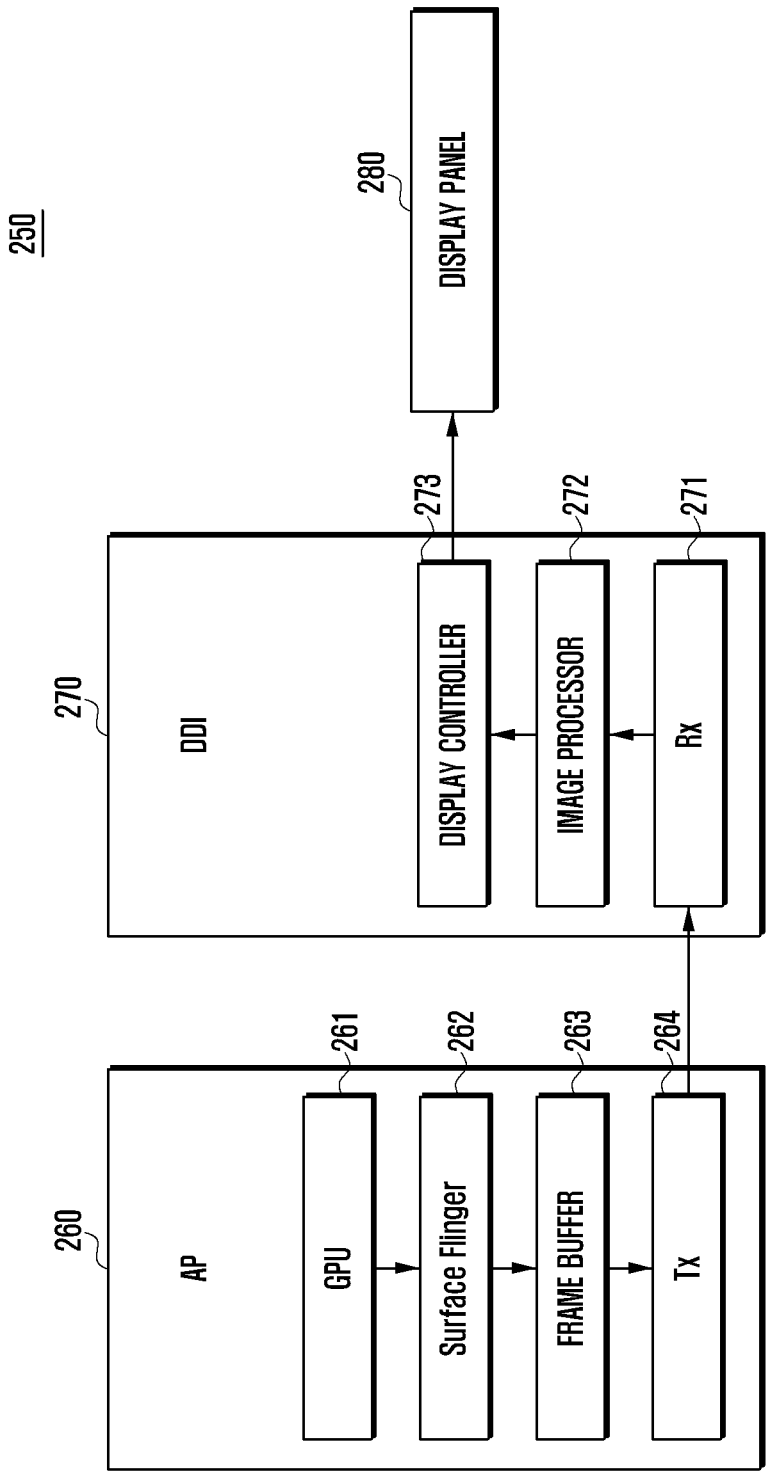
FIG. 2B is a block diagram of hardware for a method of reducing power consumption according to an embodiment of the present disclosure.

FIG. 2B is a block diagram for a method of reducing power consumption according to an embodiment of the present disclosure.

Hardware block 250 may be a part of the electronic device 100 illustrated in FIG. 1. Referring to FIG. 2B, the hardware block 250 includes an Application Processor (AP) 260, a Display Driver IC (DDI) 270, and a display panel 280.

The AP 260 includes a Graphic Processing Unit (GPU) 261, a surface flinger 262, a frame buffer 263, and a data output unit 264.

The GPU 261 may process a part of the screen to be black and white and the other part to be reversed in the power saving mode. In the power saving mode, the black and white screen may be applied to a part of the screen and the reversed screen may be applied to the other part. Information on a division of the areas (that is, information on the area to which the black and white processing is applied and the area to which the reversal is applied) may be set by the application 210, the UI framework 220, or a separate screen analysis algorithm.

The GPU 261 may convert the entire screen into a black and white screen, convert some areas of the screen to be black and white, or reverse a color of a part of the screen. The GPU 261 may convert some areas of the screen to be black and white. When more than half of the area converted to be black and white is white, the GPU 271 may reverse at least a part (for example, an image in the foreground screen) of the area converted to be black and white.

The GPU 261 may change a color user interface of the application 210 into a black user interface having areas of which the majority is black.

The surface flinger 262 may combine the background screen and the foreground screen received from the GPU 261 into one screen and store the one screen in the frame buffer 263. The data output unit Tx 264 may transfer the screen data stored in the frame buffer 263 to the DDI 270.

The DDI 270 includes a data receiver Rx 271, an image processor 272, and a display controller 273. In the power saving mode, the image processor 272 may process, instead of the GPU 261, the entire screen to be black and white, process a part of the screen to be black and white, process a part of the screen to be reversed, or process a part of the screen to be black and white and the other part to be reversed. When the image processor 272 performs the black and white reversal processing, the AP 260 may transfer the information on the division of the areas to the DDI 270. The display controller 273 controls the display panel 280 to display the screen. That is, the display controller 273 may convert the screen data received from the image processor 272 into an electrical signal and transfer the electrical signal to the display panel 280 so that the display panel 280 may display the screen.

Figure 3:
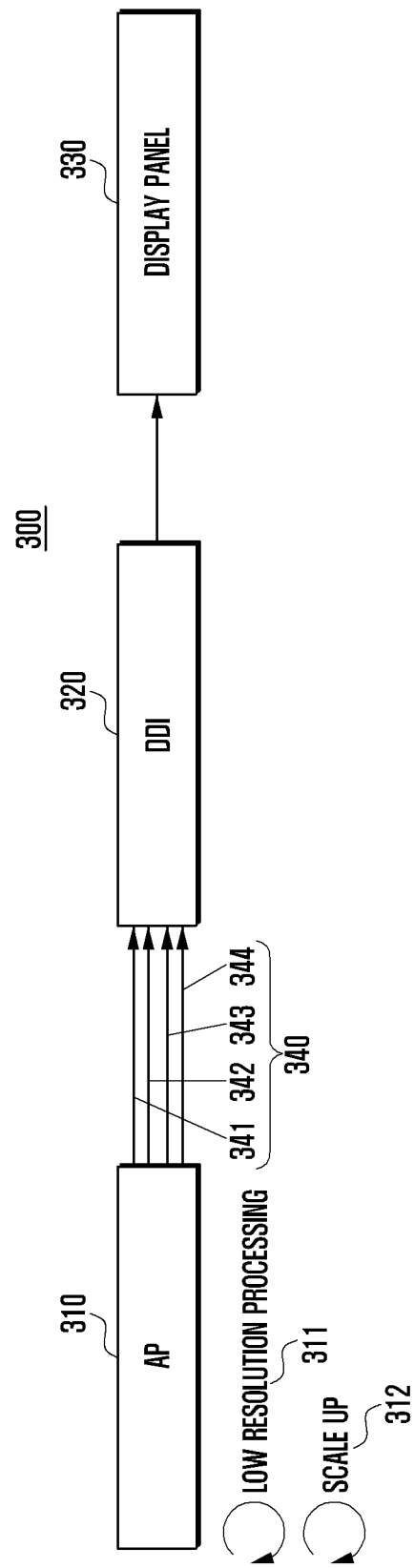
FIG. 3 is a block diagram for a method of reducing power consumption according to another embodiment of the present disclosure.

FIG. 3 is a block diagram for a method of reducing power consumption according to another embodiment of the present disclosure.

Hardware block 300 may be a part of the electronic device 100 illustrated in FIG. 1. Referring to FIG. 3, the hardware 300 may include an application processor (AP) 310, a display controller (DDI) 320, a display panel 330, and a Display Serial Interface (DSI) 340.

The application processor 310 may process at least some areas of the image data to be black and white. When the display panel is a display (for example, an LCD) which requires a backlight unit, a current reduction effect may fall short of expectations through the black and white processing of the image data alone. When the display panel is an LCD, although it is not limited thereto (for example, regardless of the type of display, when the electronic device 100 is in the power saving mode), the application processor 310 may process the image data to have a low resolution as indicated by reference numeral 311. For example, the resolution of the image data may be changed from (WQHD, 2560 by 1440) to (FHD, 1920 by 1082). The application processor 310 may scale up the image data processed to have the low resolution as indicated by reference numeral 312. For example, when the resolution of the screen is set as (WQHD, 2560 by 1440), the application processor 310 may scale up the image data processed to have the low resolution to fit (WQHD, 2560 by 1440) as indicated by reference numeral 312. The scaling up process may use interpolation of pixel data. The application processor 310 transmits the scaled-up image data to the display controller 320 through the DSI 340. For example, the scaled-up image data may be divided into several parts and the several parts may be simultaneously transmitted through serial buses 341, 342, 343, and 344.

The display controller 320 controls the display panel 330 to display the image data received from the application processor 310 through the DSI 340

According to an embodiment of the present disclosure, when the display panel is a self light emitting display (for example, AMOLED), the low resolution processing 311 and the scaling up 312 may be omitted. For example, the application processor 310 may transmit the image data having the resolution of WQHD, 2560 by 1440, of which at least some areas have been processed to be black and white, to the display controller 320 through the DSI 340.

According to an embodiment of the present disclosure, all processes for the black and white processing may be performed by the display controller 320 rather than the application processor 310.

According to an embodiment of the present disclosure, some of the black and white processing may be performed by the display controller 320 rather than the application processor 310. For example, the application processor 320 may change a chromatic color into an achromatic color in the image data to generate a black and white screen, reverse a color of the black and white color to generate a reversed screen, and transfer the reversed screen to the display controller 320. In addition, the application processor 320 may transfer information (for example, location information) on an image area of the reversed screen to the display controller 320. The display controller 320 may recognize the preserved image area in the reversed screen with reference to the information and reverse the image area again to generate a second reversed screen. The display controller 320 may display the second reversed screen. The application processor 320 may change the image data into the black and white screen and recognize the preserved image area in the black and white screen. The application processor 320 may transfer information indicating the image area to the display controller 320 together with the black and white screen. The display controller 320 may reverse the color of the image area to generate a first reversed screen and reverse the first screen to generate a second reversed screen.

Figure 4:
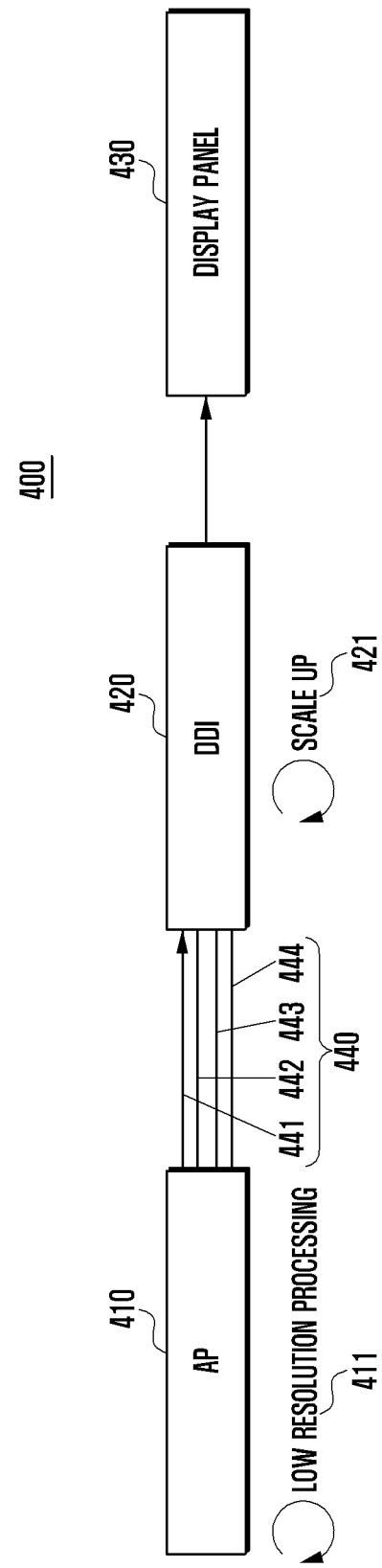
FIG. 4 is a block diagram for a method of reducing power consumption according to another embodiment of the present disclosure.

FIG. 4 is a block diagram for a method of reducing power consumption according to another embodiment of the present disclosure.

Hardware block 400 may be a part of the electronic device 100 illustrated in FIG. 1. Referring to FIG. 4, the hardware 400 includes an application processor (AP) 410, a display controller (DDI) 420, a display panel 430, and a DSI 440.

The application processor 410 may process at least some areas of the image data to be black and white. Further, the application processor 410 may process the image data processed to be black and white to have a low resolution as indicated by reference numeral 411. For example, the resolution of the image data may be changed from (WQHD, 2560 by 1440) to (FHD, 1920 by 1082). The application processor 410 transmits the image data processed to have the low resolution to the display controller 420 through the DSI 440. For example, the application processor 410 may transmit the image data processed to have the low resolution to the display controller 420 through some of a plurality of serial buses 441, 442, 443, and 444 of the DSI 440, for example, the serial bus 441. Compared to the embodiment of FIG. 3, current consumption of the application processor 410 may be reduced according to a decrease in the amount of data transmitted over the serial bus 441data.

The display controller 420 may scale up the image data, which has been processed to have the low resolution, received from the application processor 410 through the DSI 440 as indicated by reference numeral 421. For example, when the resolution of the screen is set as (WQHD, 2560 by 1440), the display controller 420 may scale up the image data processed to have the low resolution to fit (WQHD, 2560 by 1440). The display controller 420 controls the display panel 430 to display the scaled-up image data.

According to an embodiment of the present disclosure, when the display panel is a self light emitting display (for example, an AMOLED), the low resolution processing 411 and the scale up 421 process may be omitted.

According to an embodiment of the present disclosure, at least some of the black and white processing may be performed by the display controller 420 rather than the application processor 410.

Figure 5:
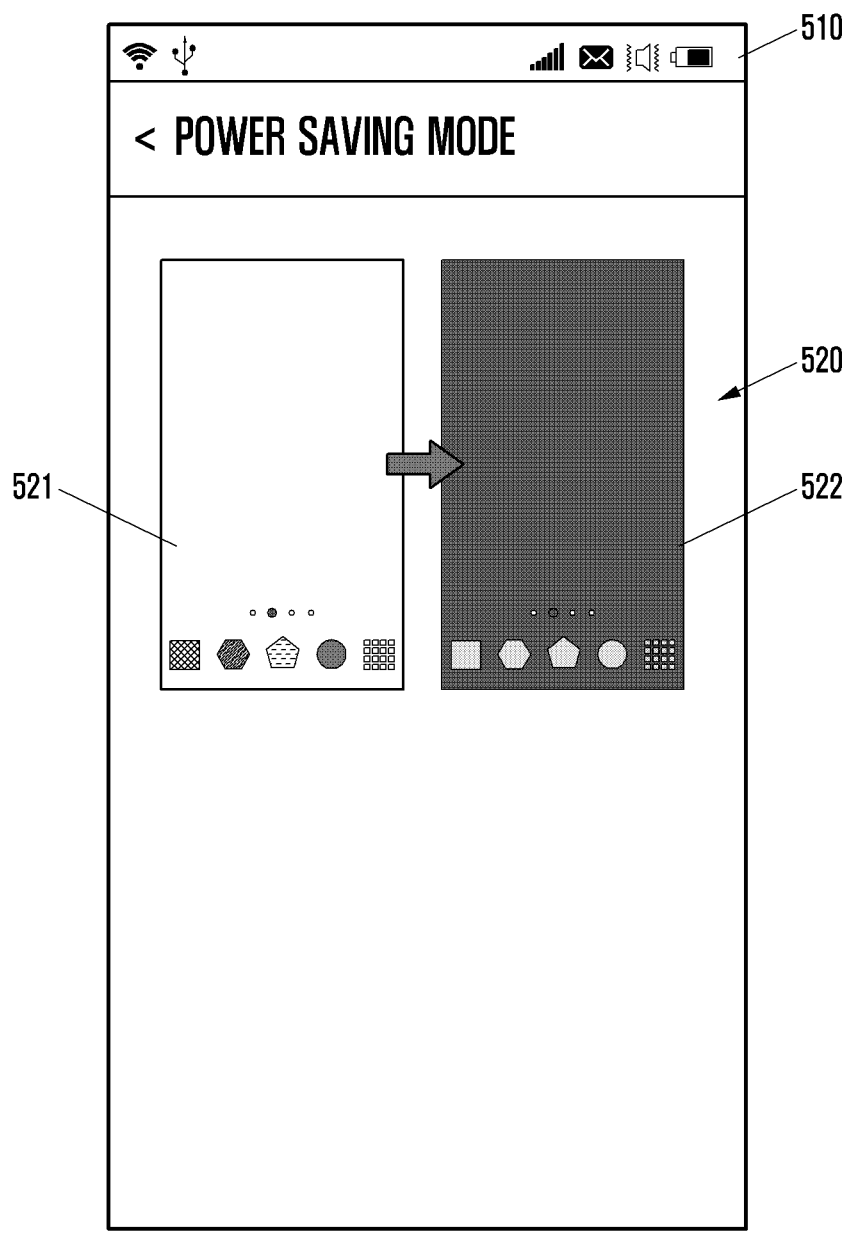
FIG. 5 illustrates a menu for setting an operation mode of the electronic device according to various embodiments of the present disclosure.

FIG. 5 illustrates a menu for setting an operation mode of the electronic device according to various embodiments of the present disclosure.

Referring to FIG. 5, the electronic device, for example, the controller 150 of the electronic device 100 may control the display unit 110 to display an indicator 510 and a menu 520 on the screen. The menu 520 may include a visual object 521 indicating a normal mode and a visual object 522 indicating a power saving mode. When the user selects or touches the visual object 522, the touch panel 113 may transfer a corresponding event to the controller 150, and the controller 150 may set, in response to the event, the operation mode of the electronic device 100 to a status in which the power saving mode can be executed.

Content to which the power saving mode can be applied may include a home screen, a webpage, a message window, a contact list, a calendar, and the like. According to an embodiment of the present disclosure, the content to which the power saving mode can be applied may be defined by the user. For example, the display unit 110 may display a content list. Each item of the content list in the display may be shown in the form by which the user can identify the corresponding content. For example, the form may be a name, an icon, or a thumbnail of the corresponding content. When any item is selected from the content list by the user, the controller 150 may set content corresponding to the selected item as a target to which the power saving mode will be applied (for example, store corresponding configuration information in the storage unit 130) in response to the selected item.

A condition for executing the power saving mode may be a residual capacity of the battery, a use rate of a memory (for example, RAM), a use rate of a processor (for example, AP), or the number of applications being executed. According to an embodiment of the present disclosure, the condition may be defined by the user. For example, when the menu for setting the residual capacity of the battery is shown on the screen and the user inputs a threshold value (for example, 20%) through the menu, the controller 150 may store the input threshold value in the storage unit 130 as a power saving mode condition. When the residual capacity of the battery is smaller than the threshold value in a state where the power saving mode can be executed, the electronic device 100 may process and display the content, to which the power saving mode is applied, to be black and white. For example, the electronic device 100 may change the whole color of the content into black and white and display the content. According to another embodiment of the present disclosure, the electronic device 100 may change the content into a black and white screen, recognize an area to be preserved in the black and white screen, reverse the remaining areas except for the area to be preserved (for example, an image area) to generate a reversed screen, and display the reversed screen.

According to an embodiment of the present disclosure, the electronic device (for example, the electronic device 100) may display a list showing content (for example, content which are not processed to be black and white even though the electronic device 100 is operating in the power saving mode) which cannot be applied to the power saving mode. The user may identify the content, which cannot be applied to the power saving mode, through the list. Further, the user may designate the content, which cannot be applied to the power saving mode, through the list.

Figure 6:
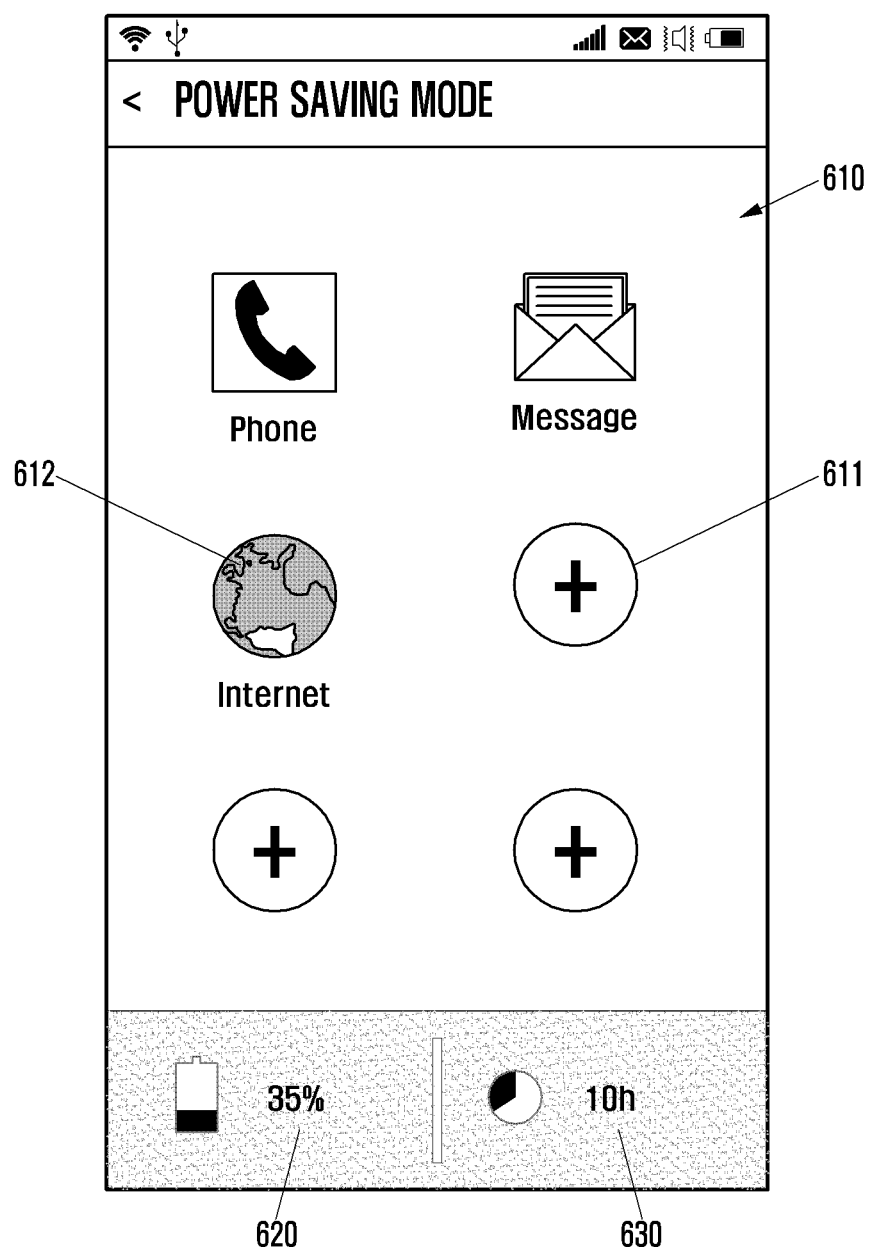
FIG. 6 illustrates a screen shot showing applications which can be used in the power saving mode of the electronic device according to various embodiments of the present disclosure.
Figure 7:
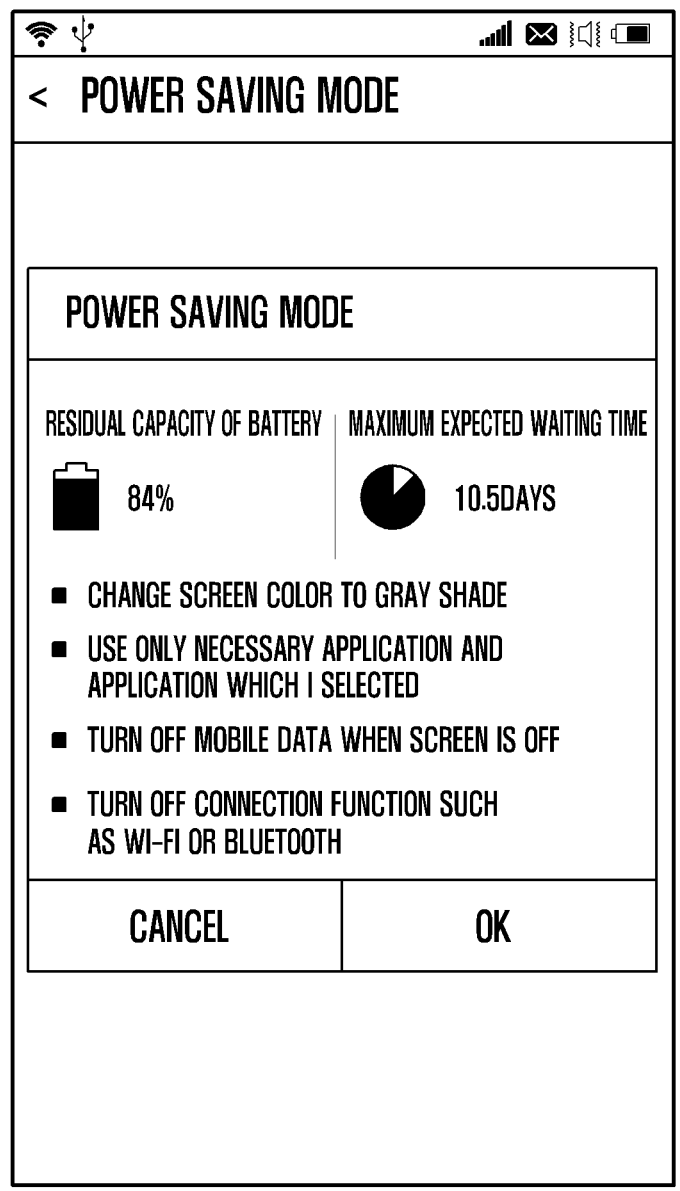
FIG. 7 illustrates a screen shot showing a battery capacity and a waiting time in the power saving mode of the electronic device according to various embodiments of the present disclosure.

FIG. 6 illustrates a list showing applications which can be used in the power saving mode of the electronic device according to various embodiments of the present disclosure. FIG. 7 illustrates a popup window showing a battery capacity and a waiting time in the power saving mode of the electronic device according to various embodiments of the present disclosure.

Referring to FIG. 6 the controller 150 of the electronic device 100 may control the display unit 110 to display an application list 610. The user may identify an application, which can be used in the power saving mode, through the application list 610. Further, the user may designate the application, which can be used in the power saving mode, through the application list 610. For example, when a plus button 611 is selected in the list 610, a popup window including items corresponding to applications, respectively, is displayed. Each of the items may have the form by which the user can identify the corresponding application and may be, for example, a name, an icon, a thumbnail, and the like. When any item is selected by the user, the controller 150 may set an application corresponding to the selected item as an application which can be used in the power saving mode (for example, store corresponding configuration information in the storage unit 130) in response to the selected item. Further, the controller 150 may control the display unit 110 to display an icon corresponding to the set application on the display unit 110 instead of displaying the plus button 611. An icon, for example, an Internet icon 612 may be deleted by the user, and then a corresponding application browser may be removed from the list of the applications, which can be used in the power saving mode.

At least some functions of the application, which are not selected (that is, applications which are not included in the application list 610) may be prohibited from being used. For example, data communication (for example, 4G, Wi-Fi, Bluetooth, or Near Field Communication (NFC)) and a Global Positioning System (GPS) signal reception through the application which is not selected may be blocked. According to an embodiment of the present disclosure, the performance of hardware may be limited while the electronic device 100 is operating in the power saving mode. For example, an LED of a touch key and a haptic feedback (for example, the electronic device 100 vibrates when the user taps an icon) may be turned off. A clock frequency of the processor or the resolution of a display may be lower compared to the normal mode. The brightness of the display and a frame rate or a touch reporting rate of the LCD may be reduced compared to the normal mode. Further, a touchscreen booster may be deactivated.

In addition to the application list 610, the display unit 110 may display information 620 showing the user a residual capacity of the battery and information 630 showing the user the remaining time until battery power is turned off. According to an embodiment of the present disclosure, the information may be shown to the user while being included in a popup window as illustrated in FIG. 7.

According to an embodiment of the present disclosure, the electronic device may display a list showing an application which cannot be used in the power saving mode. The user may identify the application which cannot be used in the power saving mode through the list. Further, the user may designate the application which cannot be used in the power saving mode through the list.

Figure 8:
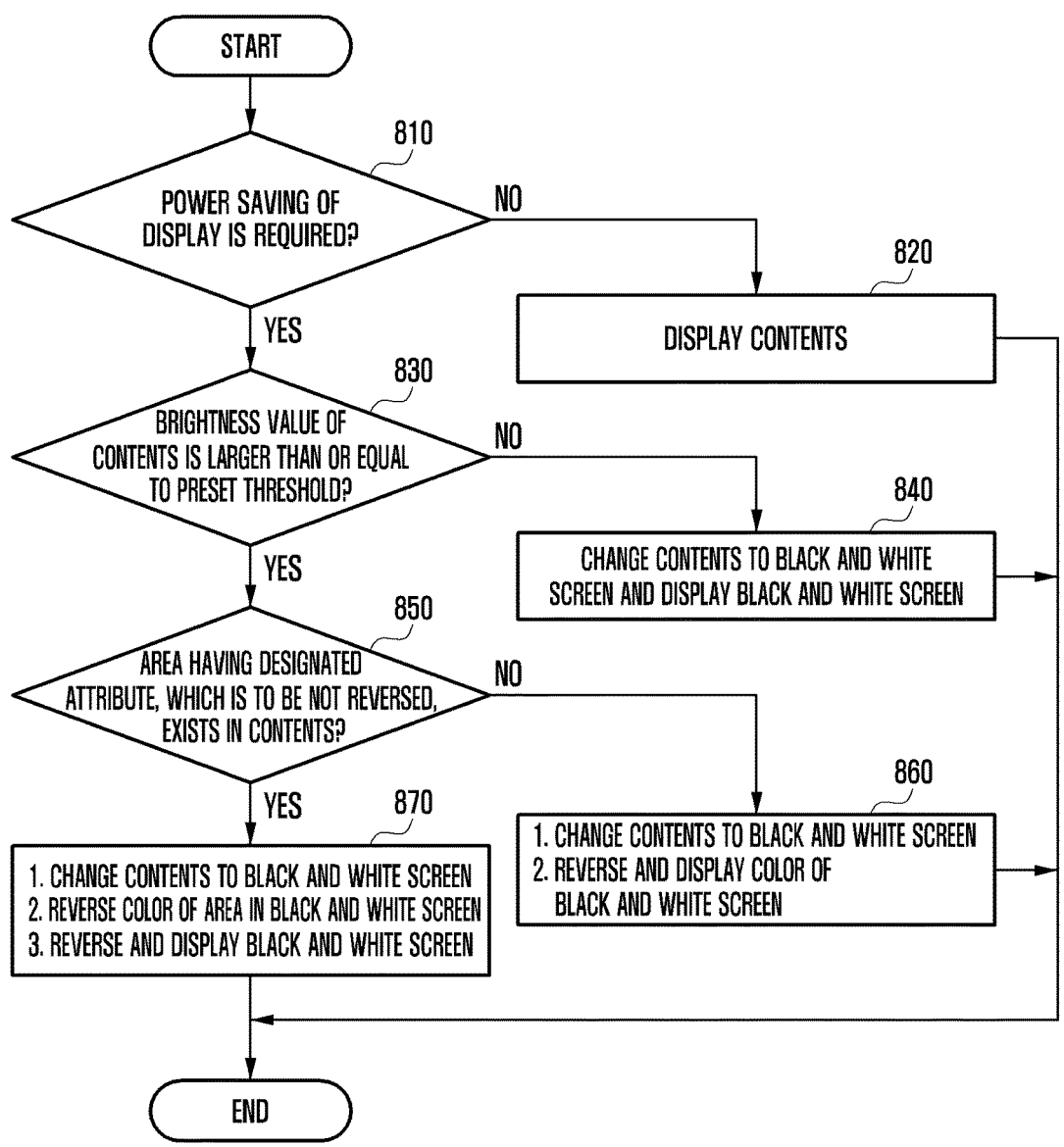
FIG. 8 is a flowchart illustrating a method of reducing power consumption according to an embodiment of the present disclosure.

FIG. 8 is a flowchart illustrating a method of reducing power consumption according to an embodiment of the present disclosure.

Referring to FIG. 8, the controller 150 determines whether power saving of the display is required in step 81. For example, the controller 150 may determine that the power saving of the display is required: i) when environment setting information stored in the storage unit 130 is read and the operation mode of the electronic device 100 is set as the power saving mode based on a result of the stored mode, ii) when a state of the electronic device 100 (for example, a residual capacity of the battery, a use rate of the memory, a use rate of the processor, or the number of applications being executed) meets a preset condition, iii) when the operation mode of the electronic device 100 is set as the power saving mode and the state of the electronic device 100 meets the preset condition, or iv) when content to be displayed (or being displayed) is designated to be power-saved.

When it is determined that the power saving of the display is not required, the controller 150 controls the display 110 to display content on the screen in step 820.

When it is determined that the power saving of the display is required, the controller 150 determines whether a brightness value of the content to be displayed on the screen (or being displayed on the screen) is larger than or equal to a preset threshold in step 830. The brightness value may be defined as a value indicating brightness of the content. For example, a range of the brightness value is from 0 to 10. The whole color of the content may be white when the brightness value is 10, and may be black when the brightness value is 0. When the display panel is a self light emitting display (for example, AMOLED), the controller 150 may calculate an On-Pixel Ratio (OPR) value and determine the OPR value as the brightness value of the content. The controller 150 may acquire R, G, and B values of each pixel, average the R, G, and B values, and determine the average value as a corresponding pixel value. The controller 150 may average pixel values and determine the average value as the OPR value.

When the brightness value is smaller than the preset threshold, the controller 150 changes the content into a black and white screen in step 840. For example, the controller 150 changes all parts of the content with a chromatic color into an achromatic color. Further, the controller 150 may control the display unit 110 to display the black and white screen. Alternatively, the controller 150 may change the content into the black and white screen and control the display unit 110 to display the black and white screen. When the content are all achromatic colors (that is, the content is already the black and white screen), the process of changing the content to the black and white screen may be omitted.

When the brightness value is larger than or equal to the preset threshold, the controller 150 determines whether an area having a predetermined attribute, which is to be preserved, exists in the content in step 850. For example, the controller 150 may divide the content into a plurality of areas and determine an area having an attribute image as the area to be preserved.

When the area to be preserved does not exist in the content, the controller 150 performs a first process of changing the content to the black and white screen and a second process of reversing the color of the black and white color to generate a reversed screen and displaying the reversed screen in step 860. The first process may be omitted when the content are already the black and white screen (for example, there is no chromatic color).

When the area to be preserved exists in the contents, the controller 150 performs the first process of changing the content to the black and white screen, the second process of reversing the color of the area to be preserved in the black and white screen to generate the reversed screen, and a third process of reversing the reversed screen to generate a second reversed screen and displaying the second reversed screen in step 870. The first process may be omitted when the content are already the black and white screen.

Figure 9:
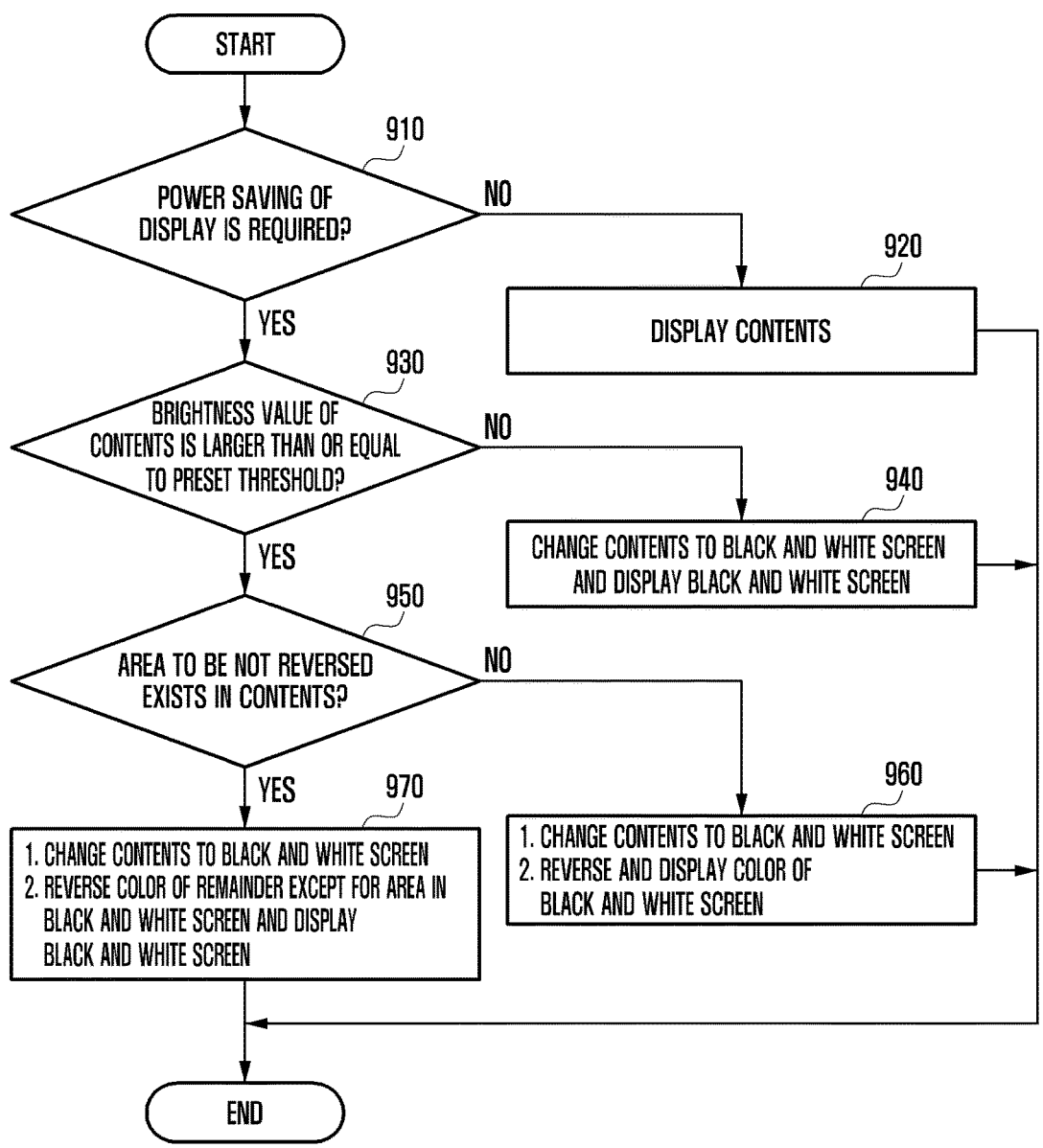
FIG. 9 is a flowchart illustrating a method of reducing power consumption according to another embodiment of the present disclosure.

FIG. 9 is a flowchart illustrating a method of reducing power consumption according to another embodiment of the present disclosure.

Referring to FIG. 9, the controller 150 determines whether power saving of the display is required in step 910.

When it is determined that the power saving of the display is not required (for example, the state of the electronic device 100 corresponds to one of the conditions described with reference to FIG. 8), the controller 150 controls the display unit 110 to display the content on the screen in step 920.

When it is determined that the power saving of the display is required, the controller 150 determines whether a brightness value of the content to be displayed on the screen (or being displayed on the screen) is larger than or equal to a preset threshold in step 930.

When the brightness value is smaller than the preset threshold, the controller 150 changes the content into a black and white screen and controls the display unit 110 to display the black and white screen in step 940. Alternatively, the controller 150 changes the content into the black and white screen and controls the display unit 110 to display the black and white screen. When the content are all achromatic colors, the process of changing the content to the black and white screen may be omitted.

When the brightness value is larger than or equal to the preset threshold, the controller 150 determines whether the area to be preserved (for example, image area) exists in the content in step 950.

When the area to be preserved does not exist in the content, the controller 150 performs a first process of changing the content to the black and white screen and a second processor of reversing the color of the black and white color to generate a reversed screen and displaying the reversed screen in step 960. The first process may be omitted when the content are already the black and white screen.

When the area to be preserved exists in the content, the controller 150 performs a first process of changing the content to the black and white screen and a second process of reversing the color of the remaining areas except for the area to be preserved in the black and white screen to generate a reversed screen and displaying the reversed screen in step 970. The first process may be omitted when the content are already the black and white screen.

Any application may have the black and white processing and the reversal process applied thereto according to settings of a manufacturer or user of the electronic device 100 regardless of the brightness of the content. Accordingly, steps 830 and 840 may be omitted in FIG. 8 and steps 930 and 940 may be omitted in FIG. 9. That is, when it is determined that the power saving of the display is required, the controller 150 performs step 850 (or step 950).

Figure 10:
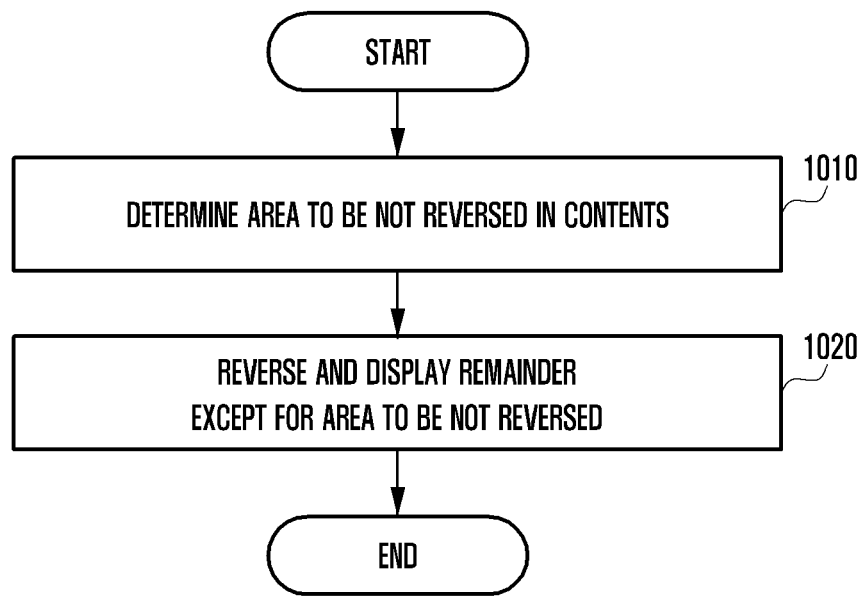
FIG. 10 is a flowchart illustrating a method of reducing power consumption according to another embodiment of the present disclosure.

FIG. 10 is a flowchart illustrating a method of reducing power consumption according to another embodiment of the present disclosure.

Referring to FIG. 10, the controller 150 (or the display controller 112) determines an area to be preserved in content to be displayed on the screen (or being displayed on the screen) in step 1010. For example, the controller 150 may divide the content into a plurality of areas and determine an area having an attribute image as the area to be preserved. For example, step 1010 may be performed when the power saving of the display is required. Further, step 1010 may be performed when it is determined that the brightness value of the content is greater than or equal to the preset threshold. The controller 150 converts the color of the remaining areas except for the area to be preserved to generate a reversed screen and control displaying of the reversed screen in step 1020.

FIGS. 11A to 11D illustrate webpages to which the power saving mode of the electronic device is applied according to various embodiments of the present disclosure.

Figure 11A:
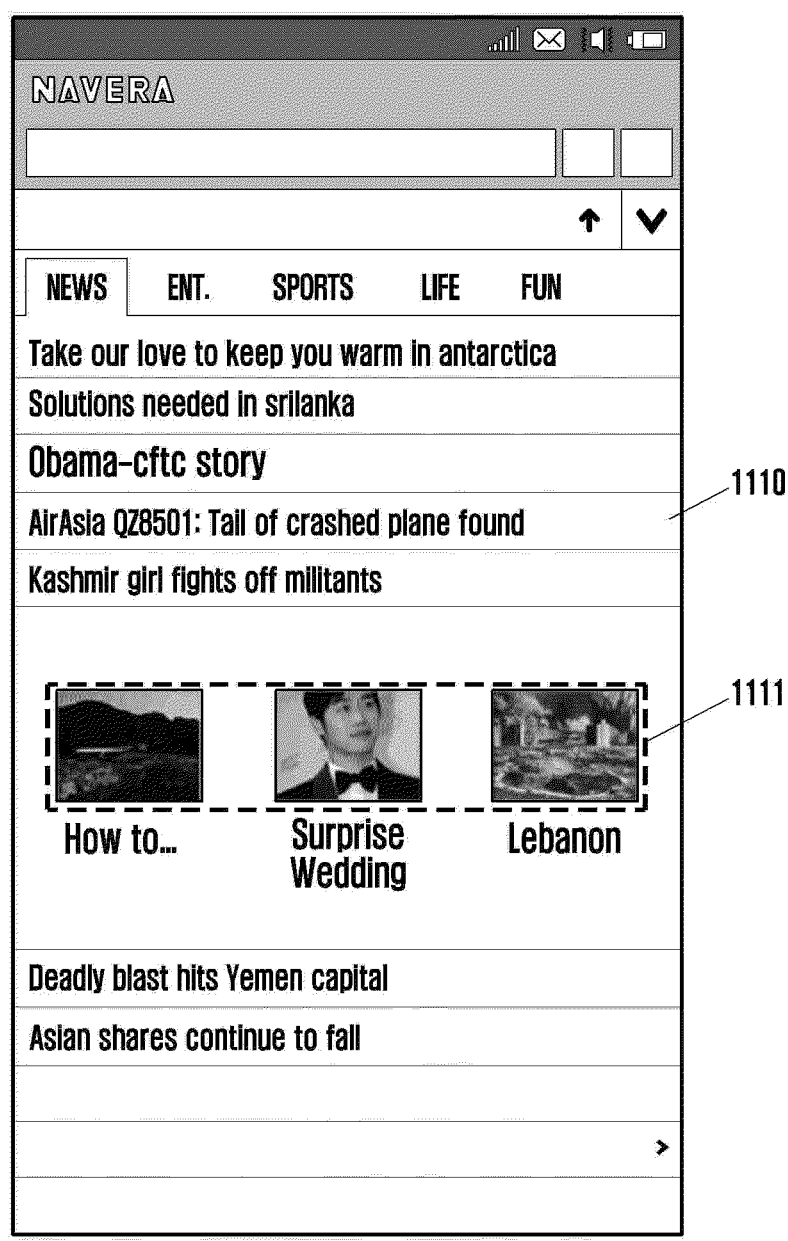
FIGS. 11A to 11D illustrate screen shots of webpages to which the power saving mode of the electronic device is applied according to various embodiments of the present disclosure.

Some elements (for example, the display controller 112 or the processor 151) of the electronic device 100 may process a webpage to be black and white to generate a first black and white screen 1110 to be shown on the screen as illustrated in FIG. 11A.

Figure 11B:
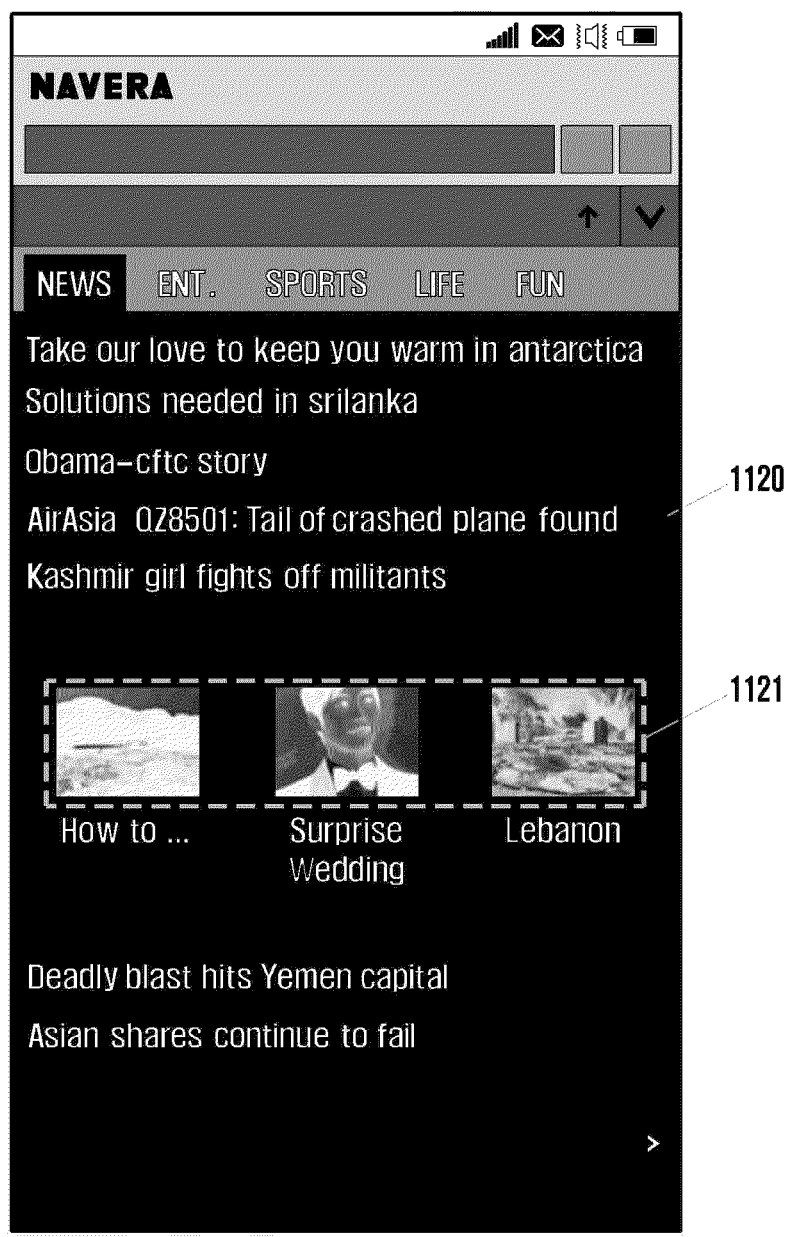

Even though the webpage is processed to be black and white, many white color families still exist, so that current reduction may fall short of expectations. Such a problem may be solved when the colors of the black and white screen 1110 are reversed. For example, the display controller 112 or the processor 151 may calculate a brightness value of the webpage and when the value is smaller than a preset threshold, reverse the whole color of the black and white screen to generate a first reversed screen 1120 as illustrated in FIG. 11B.

Although the current reduction effect has improved through the color reversal, the first reversed screen 1120 may still have a part which is difficult for the user to recognize. For example, when images 1111 are changed to images 1121 such as a photograph, the user may have difficulty in recognizing them. Such a problem may be solved through the following method examples.

Figure 11C:
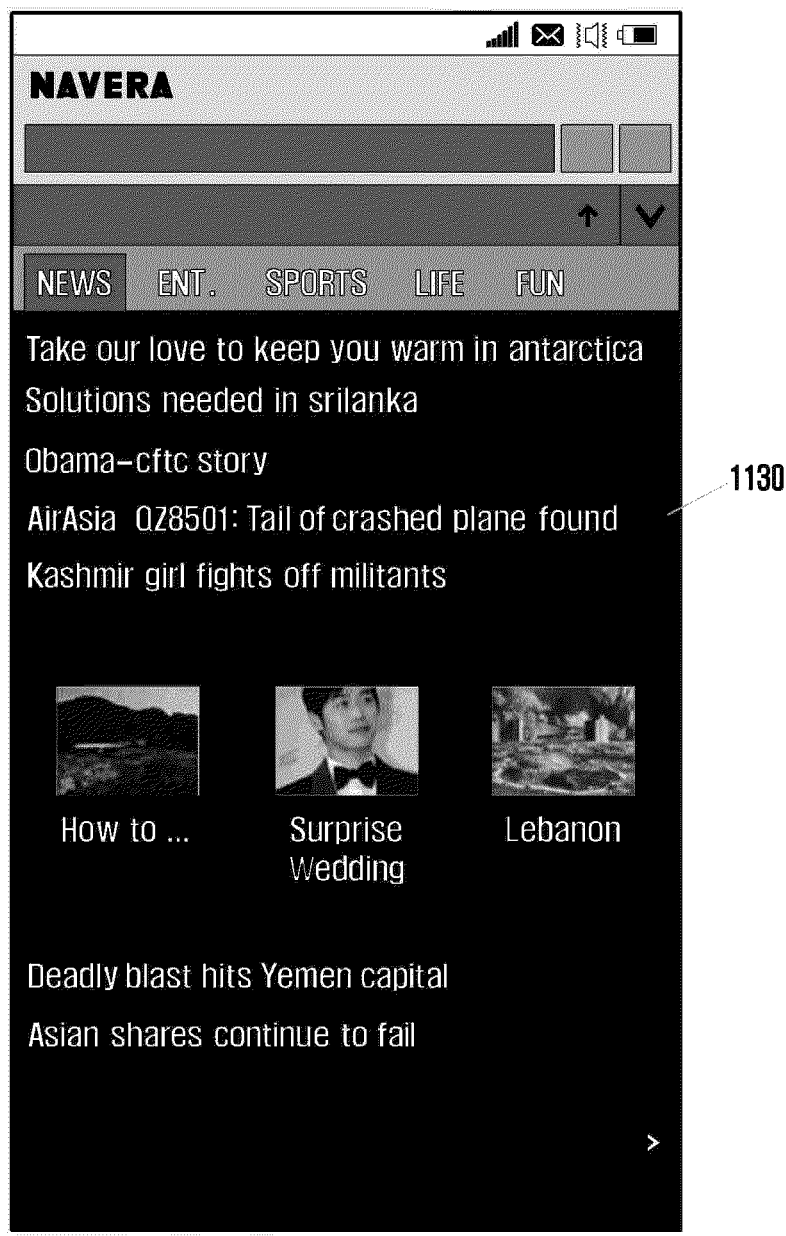

The display controller 112 or the processor 151 may reverse only the remainder except for the images 1111 in the black and white screen 1110 to generate a second reversed screen 1130 as illustrated in FIG. 11C.

According to another embodiment of the present disclosure, the display controller 112 or the processor 151 may reverse again only the second images 1121 in the reversed screen 1120 to generate the second reversed screen 1130.

Figure 11D:

According to another embodiment of the present disclosure, the display controller 112 or the processor 151 may reverse only the images 1111 in the black and white screen 1110 to generate a third reversed screen 1140 as illustrated in FIG. 11D and reverse the third reversed screen 1140 again to generate the second reversed screen 1130.

The above embodiment is not limited to a webpage and may be applied to various content.

Figure 12A:
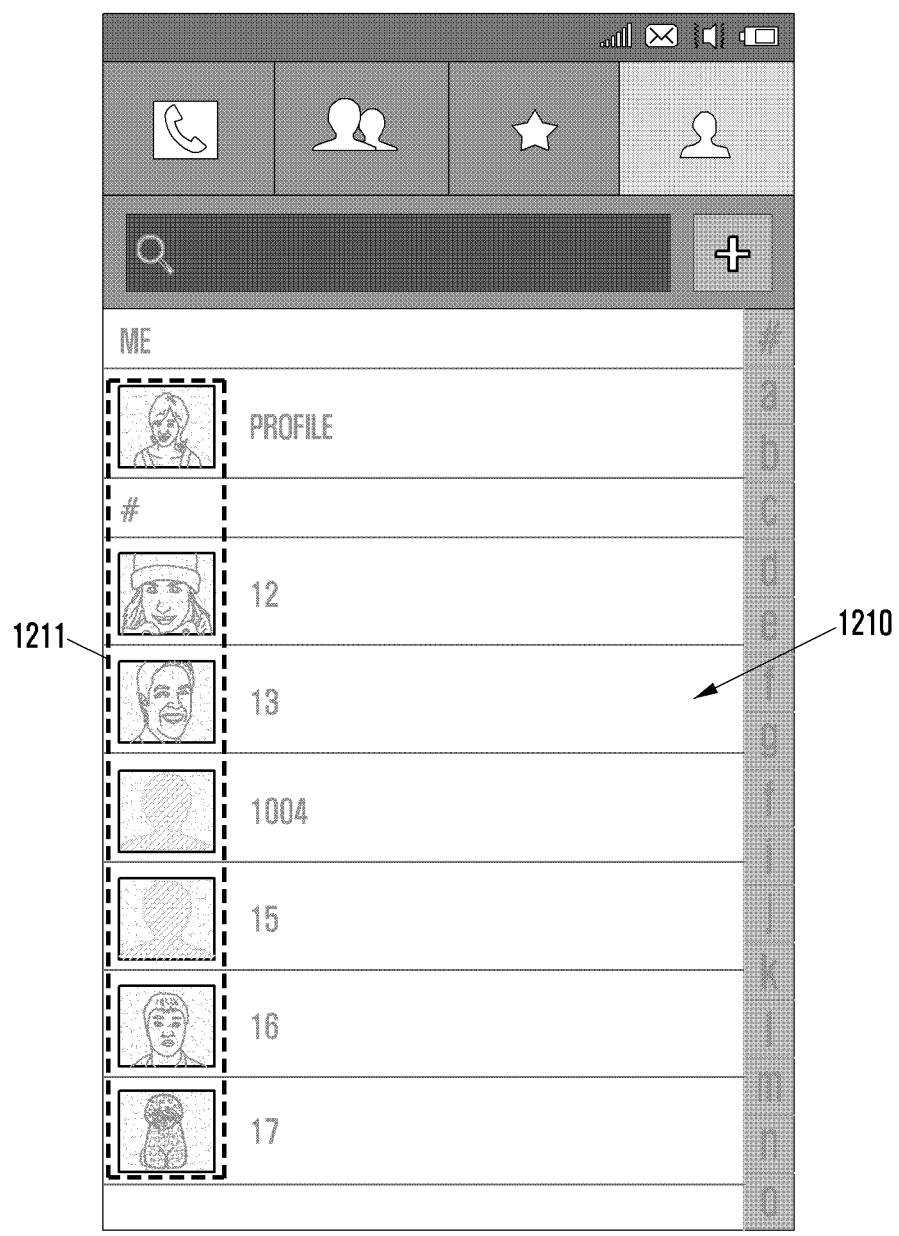
FIGS. 12A to 12C illustrate screen shots of contact lists to which the power saving mode of the electronic device is applied according to various embodiments of the present disclosure.
Figure 12B:
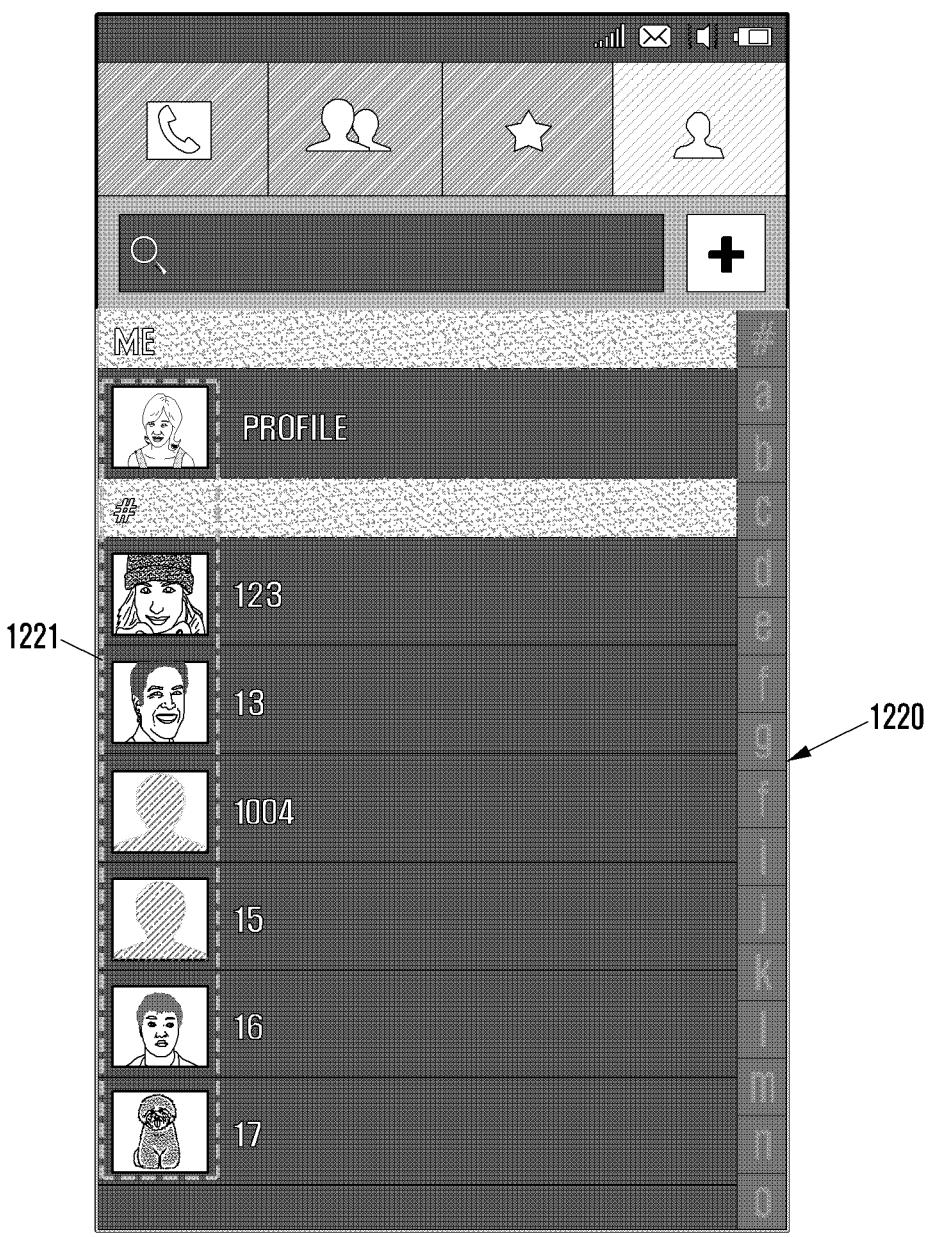
Figure 12C:
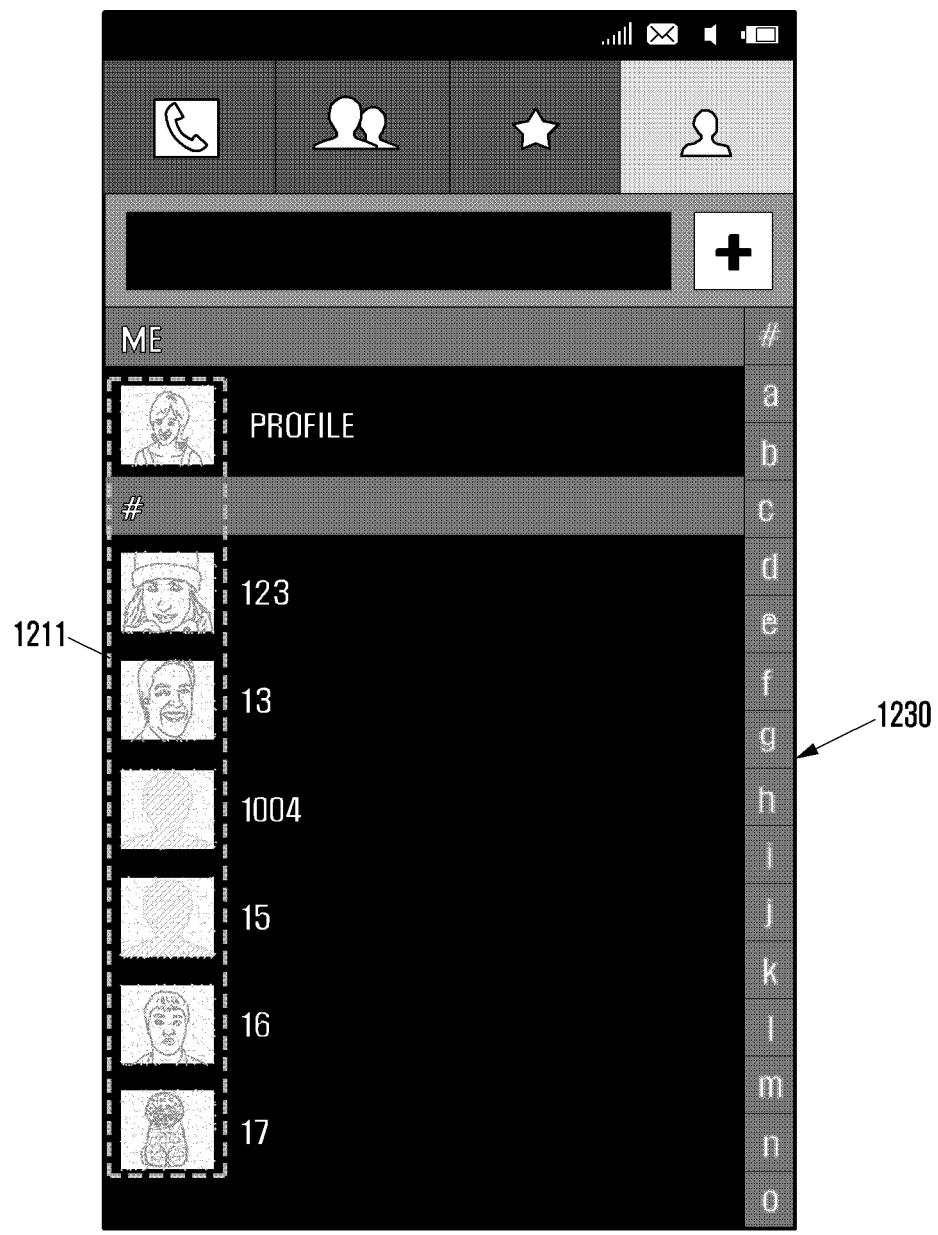

FIGS. 12A to 12C illustrate contact lists to which the power saving mode of the electronic device is applied according to various embodiments of the present disclosure.

Some elements (for example, the display controller 112 or the processor 151) of the electronic device 100 may process a contact list to be black and white to generate a black and white screen 1210 to be shown on the screen as illustrated in FIG. 12A.

The display controller 112 or the processor 151 calculates a brightness value of the content list and when the brightness value is smaller than a preset threshold reverses the remainder except for a part (for example, a color image) of the contact list to generate a first reversed screen 1220. In FIG. 12B, reference numeral 1221 may refer to a color image, which has been not processed to be black and white.

The display controller 112 or the processor 151 calculates a brightness value of the content list and when the brightness value is smaller than a preset threshold reverses the remainder except for a part (for example, a color image 1211) of the black and white screen to generate a second reversed screen 1230 as illustrated in FIG. 12C.

The above embodiment is not limited to the contact list and may be applied to various content.

Figure 13:
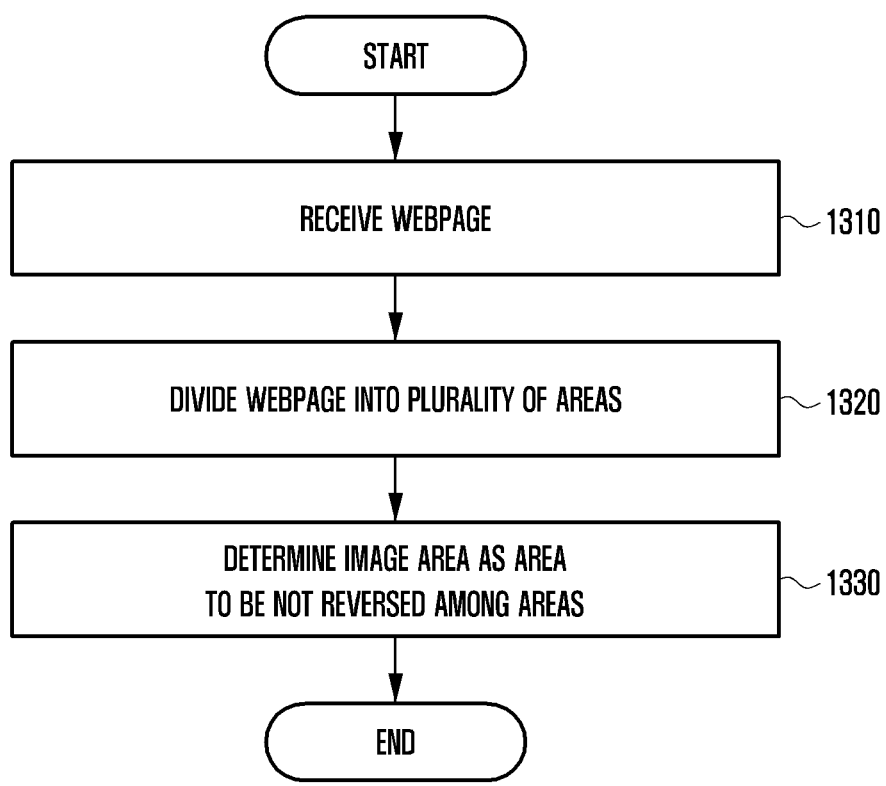
FIG. 13 is a flowchart illustrating a method of determining an area to be preserved in a webpage according to various embodiments of the present disclosure.
Figure 14:
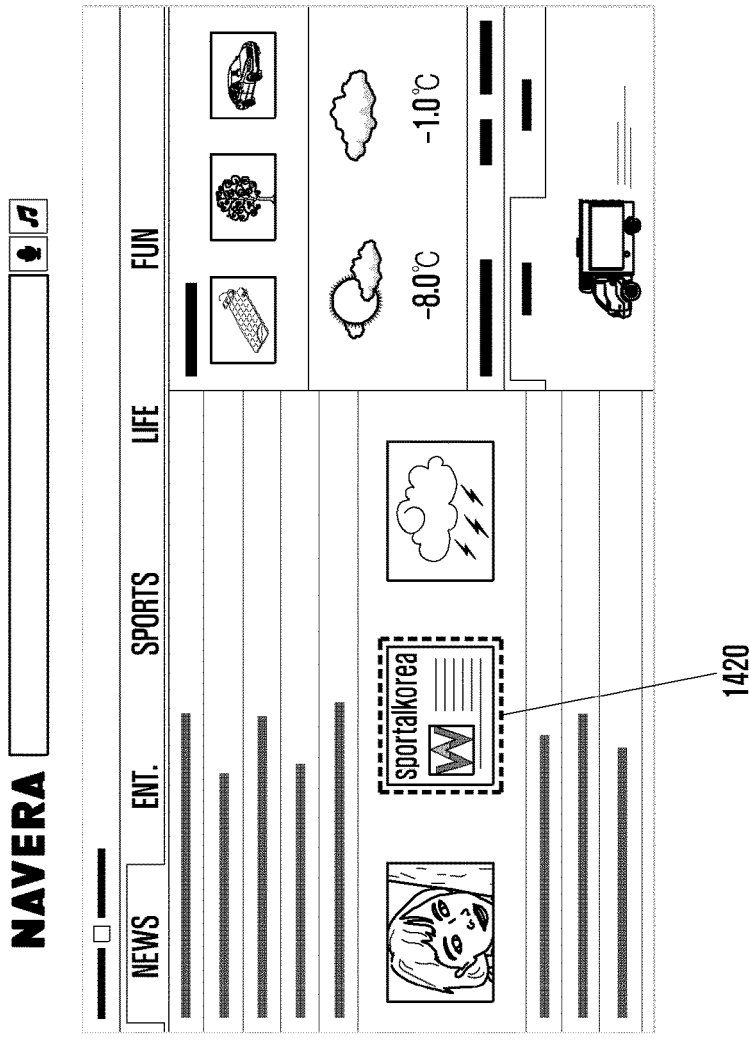
FIG. 14 illustrates a webpage and part of the sources of the webpage content.

FIG. 13 is a flowchart illustrating a method of determining an area to be preserved in a webpage according to various embodiments of the present disclosure. FIG. 14 illustrates a webpage and part of the sources of the webpage.

Referring to FIGS. 13 and 14, the controller 150 receives a webpage from an external device (for example, a web server) through the communication unit 140 in step 1310.

The controller 150 parses resources of the webpage and divides the webpage into a plurality of areas in step 1320.

In step 1330, the controller 150 determines an image area as an area to be preserved among the areas of the webpage. For example, the controller 150 may recognize an image tag 1410 in the sources and determine an area 1420 corresponding to the image tag 1410 in the webpage as the area to be preserved.

Figure 15:
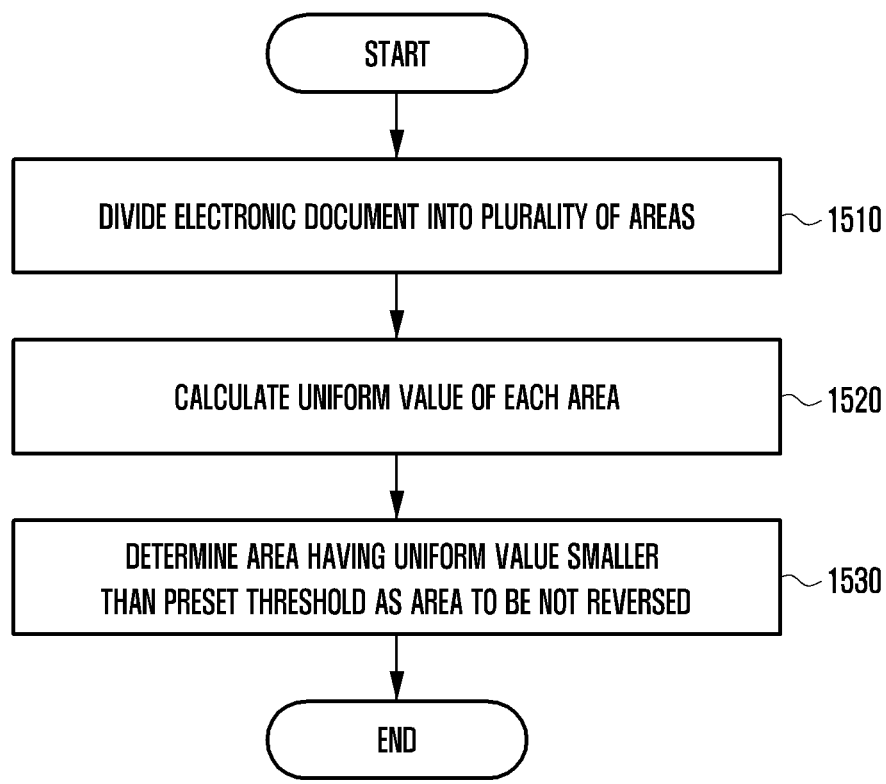
FIG. 15 is a flowchart illustrating a method of determining an area to be preserved in an electronic document according to various embodiments of the present disclosure.

FIG. 15 is a flowchart illustrating a method of determining an area to be preserved in an electronic document according to various embodiments of the present disclosure.

Referring to FIG. 15, the controller 150 divides an electronic document (for example, a webpage or an e-book page) into a plurality of areas in step 1510.

In step 1520, the controller 150 calculates a uniform value for each of the areas. The uniform value may be defined as a value indicating a uniform degree of a color in the corresponding area. For example, when the corresponding area includes larger types of color like in an image, the uniform value may be lower.

In step 1530, the controller 150 determines an area having a uniform value, which is calculated to be lower than a preset threshold, as the area to be preserved among the areas.

Figure 16:
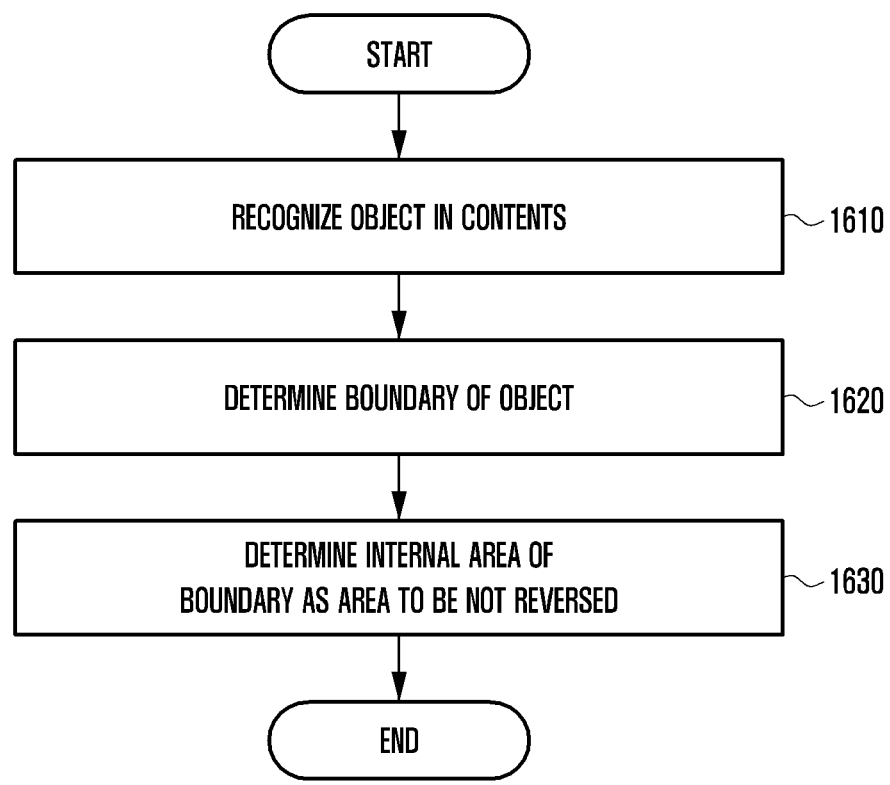
FIG. 16 is a flowchart illustrating a method of determining an area to be preserved according to various embodiments of the present disclosure.
Figure 17:
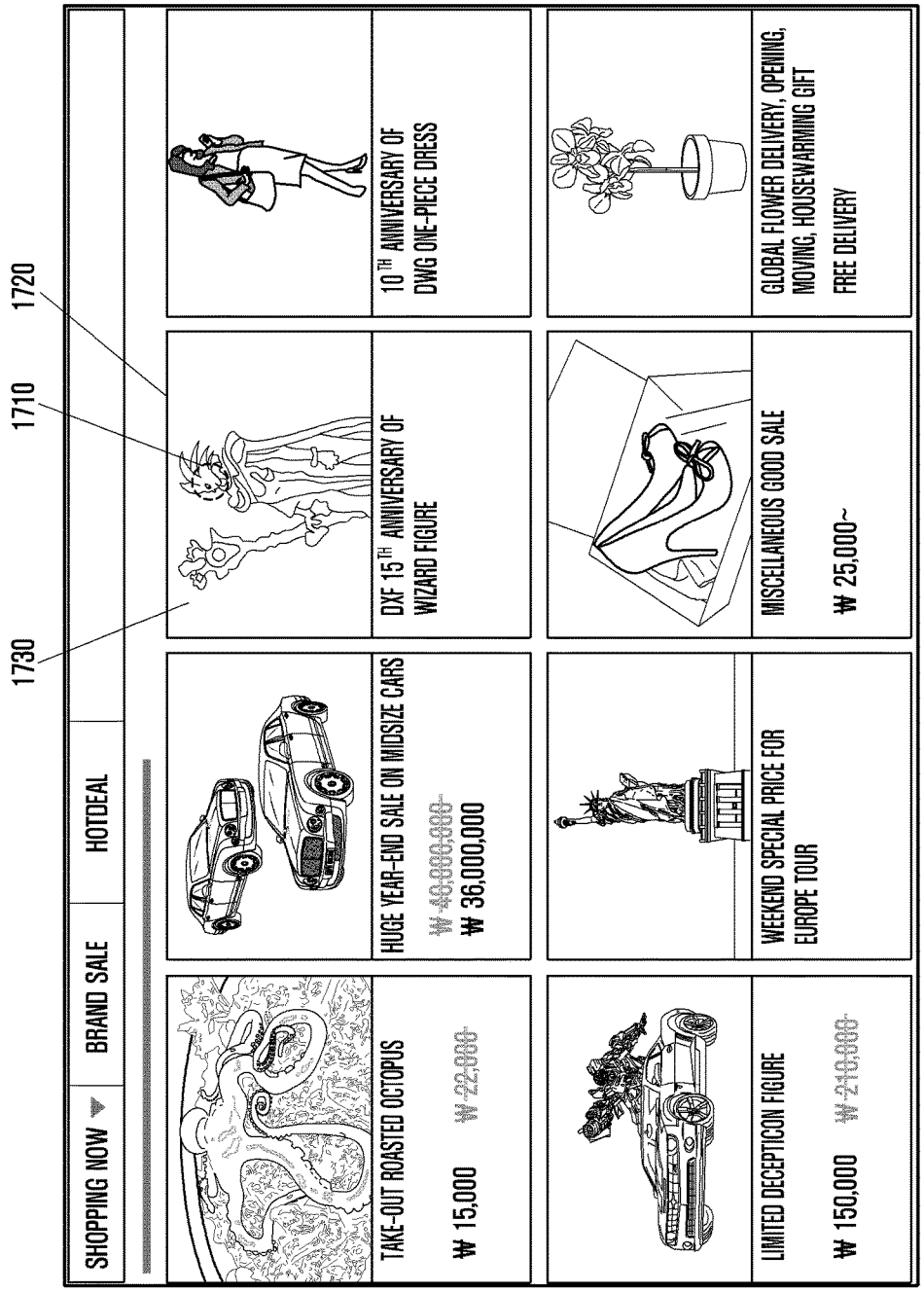
FIG. 17 illustrates a webpage according to various embodiments of the present disclosure.

FIG. 16 is a flowchart illustrating a method of determining an area to be preserved according to various embodiments of the present disclosure. FIG. 17 illustrates a webpage.

Referring to FIGS. 16 and 17, in step 1610 the controller 150 may recognize an object, for example, a face 1710 in the content. In addition to the face 1710, various objects may be recognized.

In step 1620, the controller 150 determines a boundary of the object. For example, an edge 1720 surrounding the face 1710 may be determined as the boundary.

In step 1630, the controller 150 determines an internal area 1730 of the edge 1720 determined as the boundary of the area to be preserved.

Figure 18A:
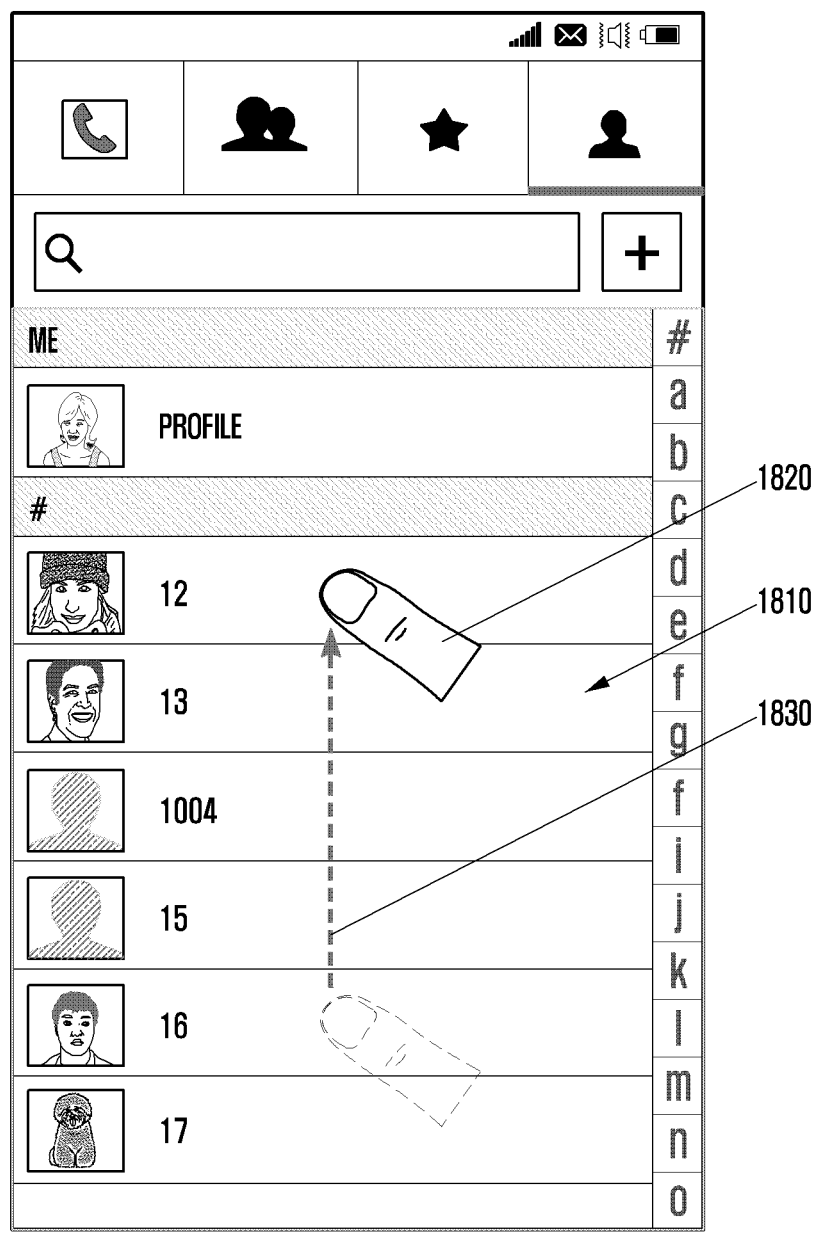
FIGS. 18A and 18B illustrate screen shots of a method of responding to a user input in the power saving mode of the electronic device according to various embodiments of the present disclosure.
Figure 18B:
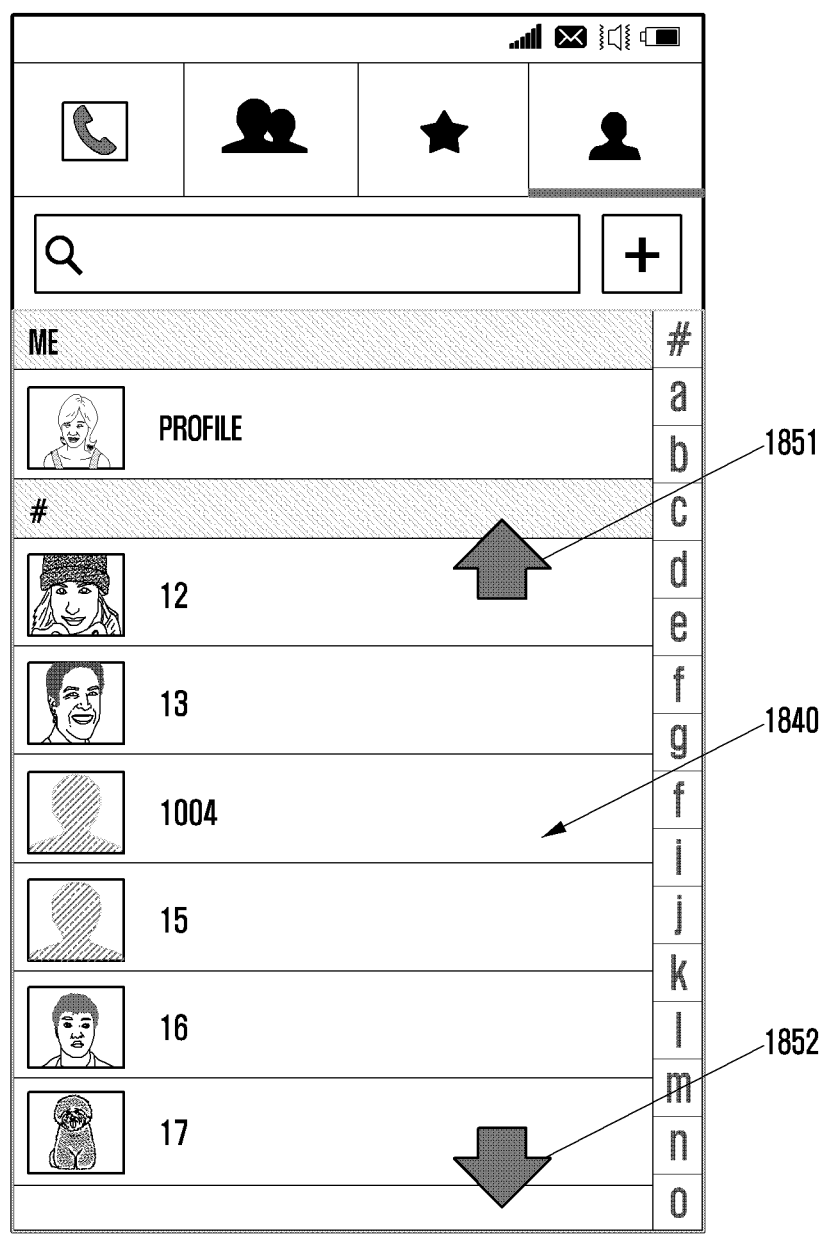
Figure 19:
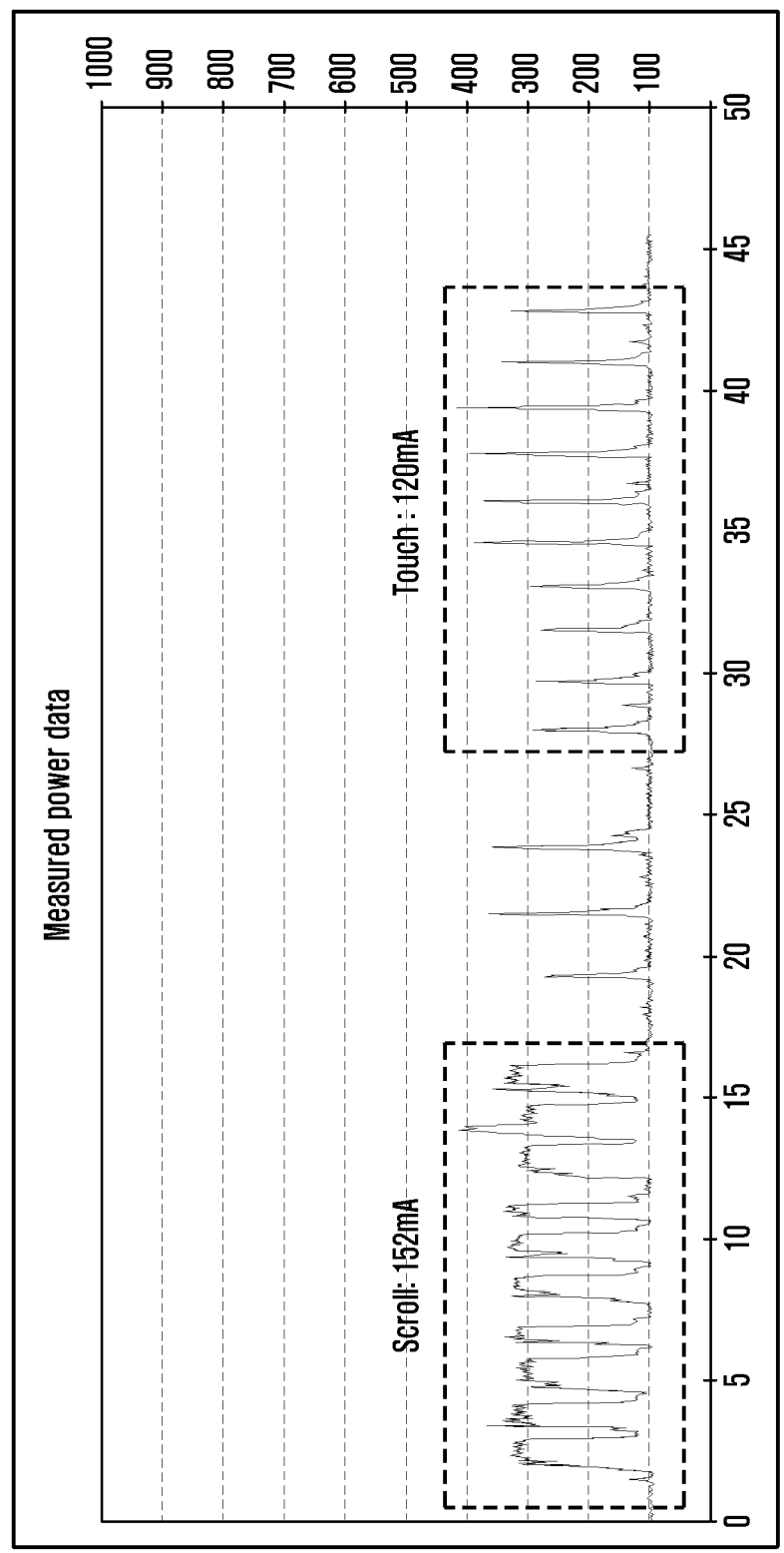
FIG. 19 illustrates the result of measurement of current consumed when a response to each of a user's scroll gesture and touch is made.

FIGS. 18A and 18B illustrate screen shots for illustrating a method of responding to a user input in the power saving mode of the electronic device according to various embodiments of the present disclosure. FIG. 19 illustrates the result of measuring the current consumed by the electronic device 100 when a response to each of a user's scroll gesture and touch is made.

Referring to FIG. 18A, the display 110 displays a part of a contact list 1810. When the user makes a scroll gesture 1830 on the part 1810 of the contact list, the touch panel 113 may transfer a corresponding event to the controller 150, and the controller 150 may scroll the part 1810 in a movement direction of a finger 1820 in response to the event. Accordingly, another part of the contact list may be displayed on the screen. That is, the display unit 110 may output an animation that makes the contact list move in the movement direction of the finger 1820 under control of the controller 150.

The output of the animation may have high current consumption compared to screen switching (terminating the displaying of the part 1810 and displaying another part). Accordingly, when the electronic device 100 operates in the power saving mode, the controller 150 may control the display unit 110 to switch the screen instead of outputting the animation. For example, referring to FIG. 18B, the controller 150 may control the display unit 110 to display an upward key 1851 and a downward key 1852 on a part 1840 of the contact list. The user may recognize that the keys 1851 and 1852 are to switch the screen through shapes of the keys. Accordingly, when the user touches the upward key 1851 or the downward key 1852, the controller 150 may control the display unit 110 to display another part instead of the part 1840 in response to the touch. Meanwhile, the controller 150 may not respond to the scroll gesture in the power saving mode.

Referring to FIG. 19, when the electronic device outputs the animation in response to the scroll gesture, 152 mA is consumed per unit time. When the electronic device switches the screen in response to the touch, 120 mA is consumed per unit time.

Figure 20:
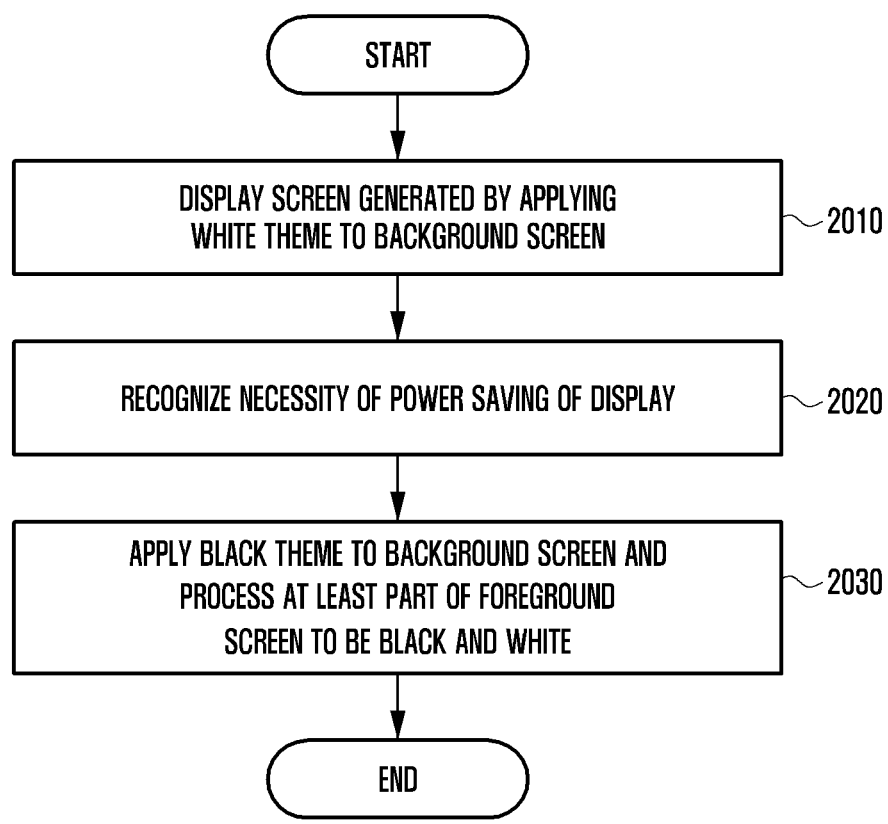
FIG. 20 is a flowchart illustrating a method of reducing power consumption according to another embodiment of the present disclosure.

FIG. 20 is a flowchart illustrating a method of reducing power consumption according to another embodiment of the present disclosure.

Referring to FIG. 20, in step 2010, the controller 150 controls the display unit 110 to display a screen, which is generated by applying the white theme 213a to the background screen, in the normal mode. In step 2020, the controller 150 recognizes that the power saving of the display is required. Upon recognition, the controller 150 may apply the black theme to the background screen and switch at least a part (for example, the remainder except for an image) of the foreground screen to be black and white in step 2030.

Figure 21:
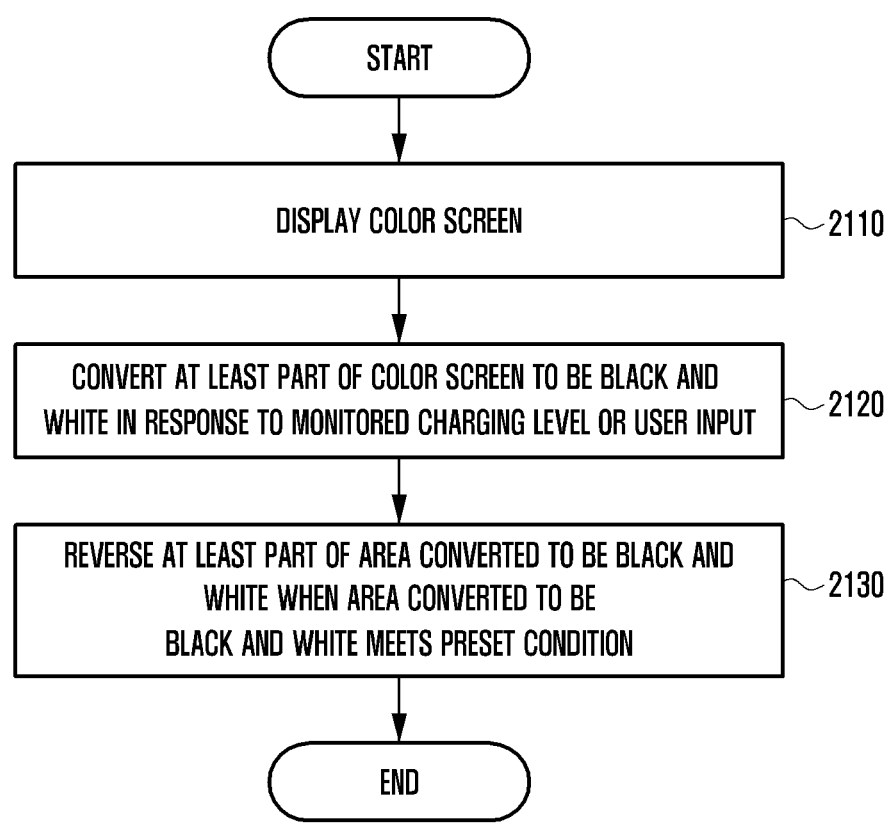
FIG. 21 is a flowchart illustrating a method of reducing power consumption according to another embodiment of the present disclosure.

FIG. 21 is a flowchart illustrating a method of reducing power consumption according to another embodiment of the present disclosure.

Referring to FIG. 21, in step 2110, the controller 150 controls the display unit 110 to display a color screen in the normal mode. In step 2120, the controller 150 converts at least a part of the color screen (for example, a user interface (for example, a menu, button, scroll bar, and the like) or a document (for example, a webpage) for an interaction with the user to be black and white in response to a battery charging level (for example, a residual amount of the battery 170 charge lower than a preset threshold) or a user input (for example, a power saving request).

The controller 150 determines whether the area converted to be black and white meets a preset condition. For example, when the majority of the area converted to be black and white is white, the controller 150 reverses at least a part (for example, a photo or image) of the area converted to be black and white in step 2130.

Figure 22:
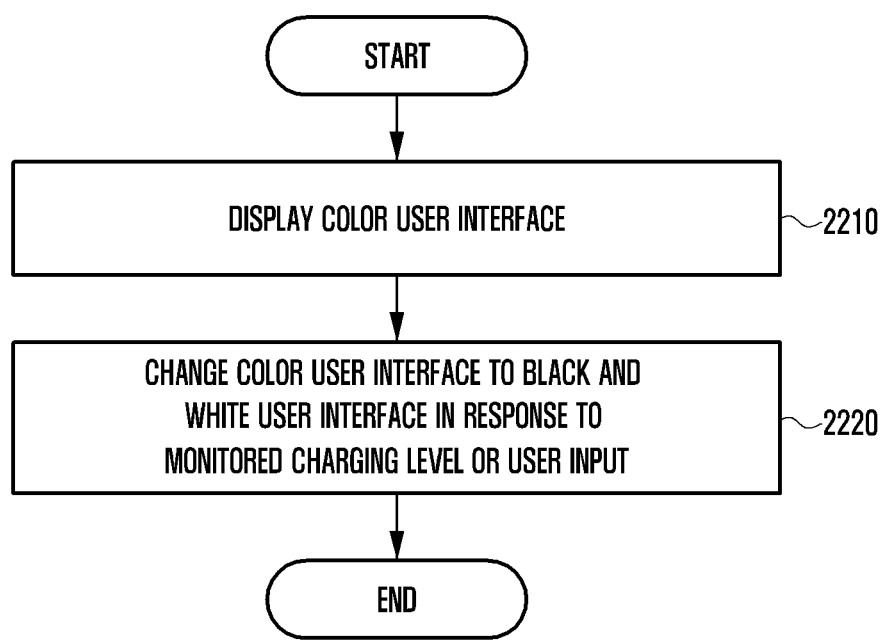
FIG. 22 is a flowchart illustrating a method of reducing power consumption according to another embodiment of the present disclosure.

FIG. 22 is a flowchart illustrating a method of reducing power consumption according to another embodiment of the present disclosure.

Referring to FIG. 22, the controller 150 controls the display unit 110 to display a color user interface (for example, a menu, a button, a scroll bar, and the like) of an application (for example, a web browser, an electronic book, and the like) in step 2210. In step 2220, the controller 150 converts the color user interface into a color user interface having the areas of which the majority are black and white in response to a battery charging level (for example, a residual amount of the battery 170 lower than a preset threshold) or a user input (for example, a power saving request).

The "module" used in various embodiments of the present disclosure may refer to, for example, a "unit" including one of hardware, software, and firmware, or a combination of two or more of the hardware, software, and firmware. The "module" may be interchangeably used with a term, such as unit, logic, logical block, component, or circuit. The "module" may be the smallest unit of an integrated component or a part thereof. The "module" may be the smallest unit that performs one or more functions or a part thereof. The "module" may be mechanically or electronically implemented. For example, the "module' according to various embodiments of the present disclosure may include at least one of an Application-Specific Integrated Circuit (ASIC) chip, a Field-Programmable Gate Arrays (FPGAs), and a programmable-logic device for performing operations which have been known or are to be developed hereafter.

According to various embodiments of the present disclosure, at least some of the devices (for example, modules or functions thereof) or the method (for example, steps or operations) according to the present disclosure may be implemented by a command stored in a computer-readable storage medium in a programming module form. When the command is executed by processors, the processors may perform a function corresponding to the command. The computer-readable storage media may be, for example, the storage unit 130. At least a part of the programming module may be implemented (e.g., executed) by a processor. At least a part of the programming module may include, for example, a module, a program, a routine, a set of instructions and/or a process for performing one or more functions.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high level language codes, which can be executed in a computer by using an interpreter, as well as machine codes made by a compiler. The aforementioned hardware device may be configured to operate as one or more software modules in order to perform the operation of various embodiments of the present disclosure, and vice versa.

A module or a programming module according to the present disclosure may include at least one of the described component elements, a few of the component elements may be omitted, or additional component elements may be included. Operations or steps executed by a module, a programming module, or other component elements according to various embodiments of the present disclosure may be executed sequentially, in parallel, repeatedly, or in a heuristic manner. Further, some operations or steps may be executed according to another order or may be omitted, or other operations may be added.

Embodiments of the present disclosure provided in the present specification and drawings are merely certain examples to readily describe the technology associated with embodiments of the present disclosure and to help the understanding of the embodiments of the present disclosure, but may not limit the scope of the embodiments of the present disclosure. Therefore, in addition to the embodiments disclosed herein, the scope of the various embodiments of the present disclosure should be construed to include all modifications or modified forms drawn based on the technical idea of the various embodiments of the present disclosure.

What is claimed is:

1. An electronic device comprising:
a display device;
a battery;
at least one processor electrically connected to the display device and the battery; and
a memory electrically connected to the at least one processor,
wherein the memory stores instructions to allow the at least one processor to calculate a uniform value indicating a degree of similarity among colors for each of a plurality of areas included in a color screen, to convert at least some of the plurality of areas of the color screen to be displayed on the display device to achromatic colors in response to one of a monitored battery charging level and a user input, and to reverse a remainder of the plurality of areas except for a part of the plurality of areas converted to achromatic colors when the instructions are executed,
wherein the part of the plurality of areas that is not reversed has a uniform value indicating a degree of similarity among colors that is lower than a preset threshold, and
wherein the reversing comprises:
changing black areas of the plurality of areas converted to achromatic colors from black to white, and
changing white areas of the plurality of areas converted to achromatic colors from white to black.

2. The electronic device of claim 1, wherein the display device includes one or more light sources, and the one or more light sources consume lower power when displaying a black color compared to a white color.

3. The electronic device of claim 1, wherein, when at least half of the plurality of areas converted to achromatic colors is white, the instructions reverse at least a part of the plurality of areas converted to achromatic colors.

4. The electronic device of claim 1, wherein, when at least 70% of the plurality of areas converted to achromatic colors are white, the instructions reverse at least a part of the plurality of areas converted to achromatic colors.

5. The electronic device of claim 1, wherein the memory stores an application program, and the instructions convert a user interface of the application program to achromatic colors and reverse at least part of the user interface converted to achromatic colors based on the monitored battery charging level when the application program is executed.

6. The electronic device of claim 5, wherein the at least part of the user interface includes a photo or an image.

7. The electronic device of claim 1, wherein the memory stores a document, and the instructions convert the document to achromatic colors and reverse at least a part of the document converted to achromatic colors based on the monitored battery charging level when the document is displayed on the display device.

8. The electronic device of claim 7, wherein the document includes a webpage and at least part of the webpage includes a photo or an image.

9. An electronic device comprising:
a display device configured to display a screen generated by applying a white theme to a background screen;
a battery;
at least one processor electrically connected to the display device and the battery; and
a memory electrically connected to the at least one processor,
wherein the memory includes an application program including a chromatic interface and an achromatic user interface, and stores instructions to allow the at least one processor to monitor a charging level of the battery, to apply a black theme to the background screen, and to change a foreground screen of the chromatic user interface displayed on the display device to the achromatic user interface in response to one of the monitored charging level of the battery and a user interface when the instructions are executed, and
wherein the white theme includes an image of which a brightness value is greater than or equal to a preset threshold and the black theme includes an image of which a brightness value is less than the preset threshold.

10. An electronic device comprising:
a display panel;
a display controller that controls the display panel; and
a processor that controls the display controller, wherein the processor recognizes an object in content, determines an internal area from an edge of the object as an area to be preserved, reverses the remainder of the content except for the area to be preserved to generate a reversed screen, and controls displaying of the reversed screen, and wherein the reversing comprises changing black areas of the remainder of the content except for the area to be preserved from black to white and changing white areas of the remainder of the content except for the area to be preserved from white to black.

11. The electronic device of claim 10, wherein the processor acquires a brightness value of the content and when the brightness value is greater than or equal to a preset threshold and the area to be preserved exists in the content, changes a chromatic color of the content to an achromatic color to generate a black and white screen, reverses the area to be preserved in the black and white screen to generate a first reversed screen, and reverses the first reversed screen to generate a second reversed screen, wherein the reversing of the area to be preserved in the black and white screen comprises changing black areas of the area to be preserved from black to white and changing white areas of the area to be preserved from white to black, and wherein the reversing of the first reversed screen to generate the second reversed screen comprises changing black areas of the first reversed screen from black to white and changing white areas of the first reversed screen from white to black.

12. The electronic device of claim 10, wherein the processor acquires a brightness value of the content and when the brightness value is greater than or equal to a preset threshold and the area to be preserved exists in the content, changes a chromatic color of the content to an achromatic color to generate a black and white screen and reverses the remainder except for the area to be preserved in the black and white screen to generate a reversed screen, wherein the reversing comprises changing black areas of the remainder except for the area to be preserved from black to white and changing white areas of the remainder except for the area to be preserved from white to black.

13. The electronic device of claim 10, wherein the processor determines whether power saving is required and when it is determined that the power saving is required, acquires a brightness value of the content and when the brightness value is greater than or equal to a preset threshold and the area to be preserved exists in the content, changes a chromatic color of the content to an achromatic color to generate a black and white screen, reverses the area to be preserved in the black and white screen to generate a first reversed screen, and reverses the first reversed screen to generate a second reversed screen, wherein the reversing of the area to be preserved in the black and white screen comprises changing black areas of the area to be preserved from black to white and changing white areas of the area to be preserved from white to black, and wherein the reversing of the first reversed screen to generate the second reversed screen comprises changing black areas of the first reversed screen from black to white and changing white areas of the first reversed screen from white to black.

14. The electronic device of claim 13, wherein, when the power saving is required a residual charge amount of the battery is lower than a preset threshold.

15. An electronic device comprising:
a display panel;
a display controller that controls the display panel; and
a processor that controls the display controller,
wherein the display controller recognizes an object in content received from the processor, determines an internal area from an edge of the object as an area to be preserved, reverses the remainder except for the area to be preserved in the content to generate a reversed screen, and controls displaying of the reversed screen, and wherein the reversing comprises changing black areas of the remainder except for the area to be preserved in the content from black to white and changing white areas of the remainder except for the area to be preserved in the content from white to black.

16. A method of reducing power consumption by an electronic device, the method comprising:
displaying a color screen on a display;
calculating a uniform value indicating a degree of similarity among colors for each of a plurality of areas;
converting at least some of the plurality of areas of the color screen to achromatic colors in response to one of a charging level of a battery and a user input; and
reversing a remainder of the plurality of areas except for a part of the plurality of areas converted to achromatic colors,
wherein the part of the plurality of areas that is not reversed has a uniform value indicating, a degree of similarity among colors that is lower than a preset threshold, and
wherein the reversing comprises changing black areas of the plurality of areas converted to achromatic colors from black to white and changing white areas of the plurality of areas converted to achromatic colors from white to black.

17. A method of reducing power consumption by an electronic device, the method comprising:
displaying a screen generated by applying a white theme to a background screen on a display; and
applying a black theme to the background screen and changing at least a part of a foreground screen on the display to achromatic colors in response to one of a charging level of a battery and a user input,
wherein the white theme includes an image of which a brightness value is greater than or equal to a preset threshold and the black theme includes an image of which a brightness value is less than the preset threshold.

18. A method of reducing power consumption by an electronic device, the method comprising:
recognizing an object in content on a screen;
determining a boundary of the object;
determining an internal area from an edge of the object as an area to be preserved;
reversing the remainder of the content except for the area to be preserved in the content to generate a reversed screen; and
controlling the display of the reversed screen,
wherein the reversing comprises changing black areas of the remainder of the content except for the area to be preserved in the content from black to white and changing white areas of the remainder of the content except for the area to be preserved in the content from white to black.

* * * * *